United States Patent
Janse van Rensburg et al.

(10) Patent No.: US 8,607,067 B1
(45) Date of Patent: Dec. 10, 2013

(54) TECHNIQUES FOR ATTESTING TO INFORMATION

(75) Inventors: Cornelle Christiaan Pretorius Janse van Rensburg, Cape Town (ZA); Marc J. Brooker, Cape Town (ZA); David Brown, Cape Town (ZA); Abhinav Agrawal, Seattle, WA (US); Matthew S. Garman, Seattle, WA (US); Kevin Ross O'Neill, Seattle, WA (US); Eric Jason Brandwine, Haymarket, VA (US); Christopher Richard Jacques de Kadt, Cape Town (ZA); Mark Joseph Cavage, Seattle, WA (US)

(73) Assignee: Amazon Technologies, Inc., Reno, NV (US)

(*) Notice: Subject to any disclaimer, the term of this patent is extended or adjusted under 35 U.S.C. 154(b) by 168 days.

(21) Appl. No.: 13/038,277

(22) Filed: Mar. 1, 2011

(51) Int. Cl.
*H04L 29/06* (2006.01)

(52) U.S. Cl.
USPC .......................................... 713/189

(58) Field of Classification Search
None
See application file for complete search history.

(56) References Cited

U.S. PATENT DOCUMENTS

| | | | |
|---|---|---|---|
| 2005/0108709 A1* | 5/2005 | Sciandra et al. | 718/1 |
| 2005/0251808 A1 | 11/2005 | Gbadegesin et al. | |
| 2008/0040794 A1* | 2/2008 | Larson | 726/15 |
| 2009/0089860 A1* | 4/2009 | Forrester et al. | 726/3 |
| 2009/0313620 A1* | 12/2009 | Sedukhin et al. | 718/1 |

OTHER PUBLICATIONS

Berners-Lee et al., "Uniform Resource Identifier (URI): Generic Syntax, Request for Comments (RFC) 3986", Jan. 2005. Network Working Group. [retrieved on Jul. 1, 2013] Retrieved from the internet: <URL: http://www.ietf.org/rfc/rfc3986.txt>.
U.S. Appl. No. 12/981,231, filed Dec. 29, 2010, Titled: Techniques for Credential Generation.

* cited by examiner

*Primary Examiner* — Jeffrey Pwu
*Assistant Examiner* — William Corum, Jr.
(74) *Attorney, Agent, or Firm* — Kilpatrick, Townsend & Stockton, LLP

(57) ABSTRACT

Systems and methods for attesting to information about a computing resource involve electronically signed documents. For a computing resource, a document containing information about the resource is generated and electronically signed. The document may be provided to one or more entities as an attestation to at least some of the information contained in the document. Attestation to information in the document may be a prerequisite for performance of one or more actions that may be taken in connection with the computing resource.

35 Claims, 23 Drawing Sheets

TECHNIQUES FOR ATTESTING TO INFORMATION

CROSS REFERENCE TO RELATED APPLICATIONS

This application incorporates by reference for all purposes the full disclosure of application Ser. No. 12/981,231, entitled "Techniques for Credential Generation" filed on Dec. 29, 2010.

BACKGROUND

Modern computing networks provide access to a wide variety of computing resources such as data archives, search engines, data processing, data management, communications, and electronic marketplaces, as well as media and entertainment services. As the number and size of such computing resources, and their user communities, have grown and as these resources and communities become more sophisticated, a need has arisen to establish increasingly sophisticated usage policies. For example, such policies may include policies that address security, privacy, access, regulatory and cost concerns.

Often, policy enforcement in connection with computing resources involves the attestation to one or more properties of a computing resource. As an example, a computing resource may be required to have one or more properties before a particular action can be taken in connection with the computing resource. Entities able to provide updates to computing applications, for instance, often require that the applications being updated are properly licensed. Traditional techniques for attesting to such properties, such as techniques utilizing manual registration, can be cumbersome and inconvenient. Moreover, modern computer networks often involve the control and administration of multiple devices, including multiple virtual devices. Therefore, the disadvantages of traditional techniques for attesting to various properties are even more pronounced in multiple device environments, such as Infrastructure as a Service (IaaS) and other environments.

BRIEF DESCRIPTION OF THE DRAWINGS

Various embodiments in accordance with the present disclosure will be described with reference to the drawings, in which.

Same numbers are used throughout the disclosure and figures to reference like components and features, but such repetition of number is for purposes of simplicity of explanation and understanding, and should not be viewed as a limitation on the various embodiments.

DETAILED DESCRIPTION

Figure 1:
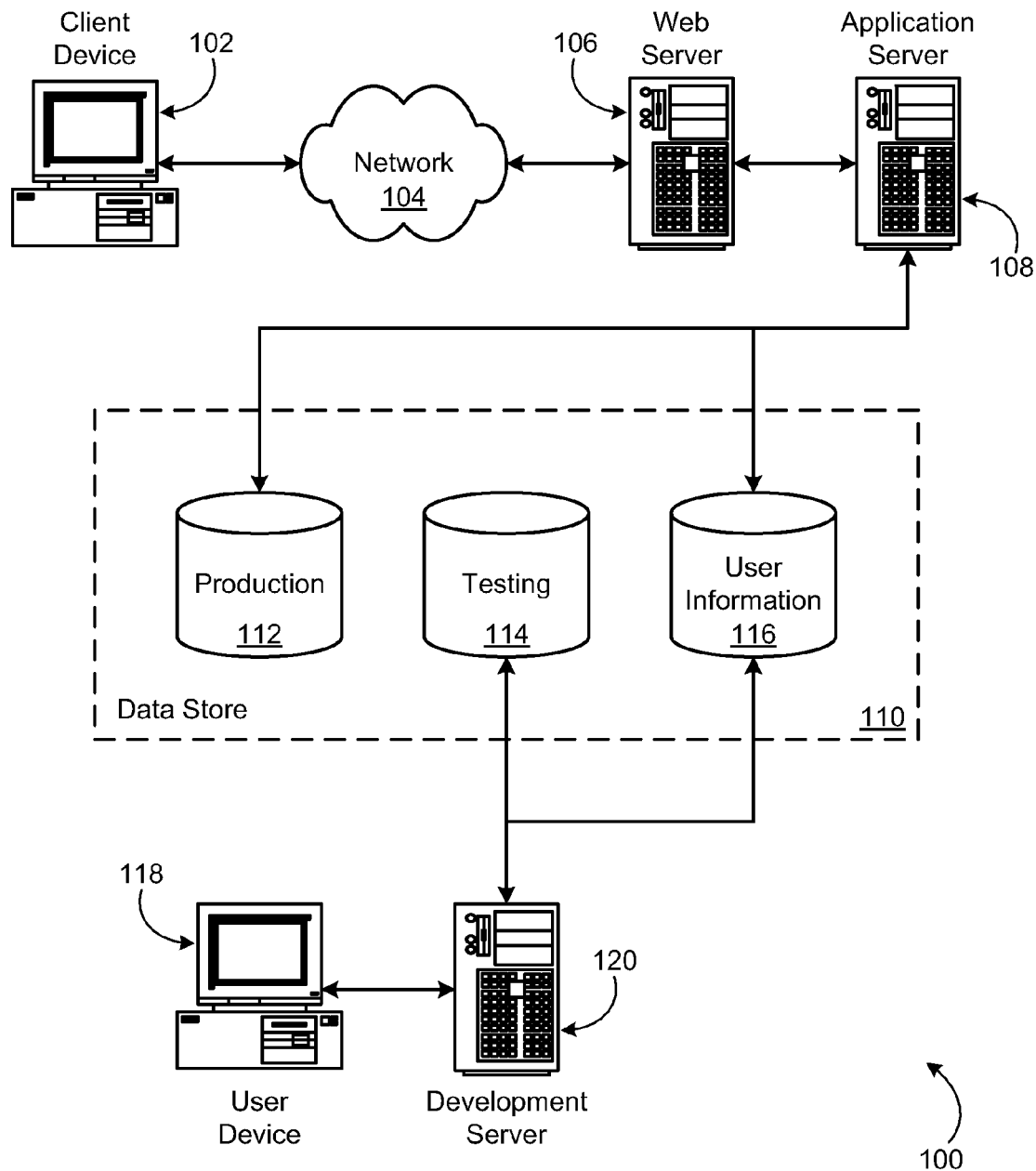
FIG. 1 is a schematic diagram illustrating an example environment for implementing aspects in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein include systems and methods for attesting to one or more properties and for using such attestations. The properties may be properties of, or relating to, one or more computing resources, such as of one or more virtual machine instances. The properties may, for example, relate to an identity of a computing resource, characteristics of the computing resource's configuration, the timing of one or more events in connection with the computing resource, the location and/or role of the computing resource in a network, capabilities of the computing resource, licensing information, and/or other characteristics relating to the computing resource. The properties may also relate to characteristics of groups of computing resources, such as networks and other collections of computing resources. Generally, the techniques described and suggested herein may be used to attest to any type of information, data, or content.

In an embodiment, a document is generated that encodes one or more properties of a computing resource. The document may be generated by a device in a control environment of a remote computing services provider that provides hardware and other resources for operation of the computing resource for which the document is generated. The document may encode the one or more properties in a format that is both human-readable and machine-readable, although any manner of encoding the one or more properties may be used. At a time after the document is generated, in an embodiment, the document is cryptographically signed. A public-key document signature algorithm may be used to sign the document and a corresponding public key may be made available to one or more entities such that an entity having the document, a signature of the document, and the public key may process the document accordingly to determine whether the document has been altered since the time the document was signed. The signature of the document may be separate from the document or part of the document.

In an embodiment, the signed document is made available to the computing resource or other resource operating in connection with the computing resource for attestation to one or more properties encoded by the document. The document and its signature may be, for example, provided to the computing resource to enable the computing resource to provide the document as necessary. The document may otherwise be made available for use. For instance, the document may be made available to a service that may provide the document upon request of the computing resource and/or another resource.

As noted, a signed document that has been generated for a computing resource may be used to attest to one or more properties encoded by the document. Attestation to one or more of the properties encoded by the document may be a prerequisite to one or more actions being taken. Information in the document may, for example, be used in one or more authentication processes to allow the computing resource to access one or more other computing resources. The document may also be used to verify various characteristics about the computing resource, such as whether the computing resource has a requisite configuration, requisite capabilities, requisite licenses for one or more components of or utilized by the computing resource, and/or any characteristics about the computing resource.

To attest to one or more properties in a signed document that has been generated for a computing resource, in an embodiment, the document is provided to a device operable to process the document to determine whether any requisite properties are indicated by the document. The device may be, for example, a device that is a third party to a remote computing services provider that provides the use of hardware to operate the computing resource. The device may also be a device of the remote computing services provider or, generally, any device operable to process the document. As noted above, the device that has received the signed document may verify that the document has not been altered since the document has been signed. If the document is determined to be unaltered, the device may determine whether any requisite properties are encoded by the document. The device may, in some embodiments, take one or more additional actions with respect to the document. For instance, in an embodiment, a remote computing services provider that generated the document may provide a service that enables the verification of information in or relating to the document. The service may, for instance, be callable by a device to determine whether information contained in the document is still valid, whether the document is expired, whether the document corresponds to a currently operating computing resource, and, generally, any suitable information that the service may be configured to provide.

As noted, if requisite properties are encoded by the document, the device may perform or cause to be performed by another device, one or more actions. An update to a component of the computing resource may, in one embodiment, be provided with an update from an update repository. In another example, a load balancer may begin directing network traffic to the computing resource. As yet another example, a network connection with the computing resource may be established to enable the computing resource to access one or more other computing resources. Generally, any action that may be made contingent, at least in part, on information contained in the document may be taken.

Variations of the above description are also described and suggested herein. For example, in some embodiments, multiple documents are generated for a computing resource. As an example, a document may be generated for each of a plurality of services to which the computing resource may need to attest to one or more properties. The information in each of the documents may be specific to the service for which the document is used. When an action for which attestation to one or more properties is a prerequisite is to be taken, one or more documents that encode the one or more prerequisite properties may be selected. In this manner, unnecessarily providing unneeded information may be at least partially avoided. As another example, in some embodiments, documents are generated and signed on demand. The information in documents generated on demand may vary according to the reason for which the documents were generated. Documents generated on demand may, for example, contain only that information which is necessary for one or more actions to be performed. Other variations are contemplated as being within the scope of the present disclosure, including those described in more detail below.

Various approaches may be implemented in various environments for various applications. For example, FIG. 1 illustrates aspects of an example environment 100 for implementing aspects in accordance with various embodiments. As will be appreciated, although a Web-based environment may be utilized for purposes of explanation, different environments may be utilized, as appropriate, to implement various embodiments. The environment 100 shown includes both a testing or a development portion (or side) and a production portion. The production portion includes an electronic client device 102, which may include any appropriate device operable to send and receive requests, messages, or information over an appropriate network 104 and convey information back to a user of the device 102. Examples of such client devices include personal computers, cell phones, smart phones, handheld messaging devices, laptop computers, tablet computers, set-top boxes, personal data assistants, electronic book readers, and the like.

The network 104 may include any appropriate network, including an intranet, the Internet, a cellular network, a local area network, a wide area network, a wireless data network, or any other such network or combination thereof. Components utilized for such a system may depend at least in part upon the type of network and/or environment selected. Protocols and components for communicating via such a network are well known and will not be discussed herein in detail. Communication over the network may be enabled by wired or wireless connections, and combinations thereof. In this example, the network 104 includes the Internet, as the environment includes a Web server 106 for receiving requests and serving content in response thereto, although for other networks an alternative device serving a similar purpose could be utilized as would be apparent to one of ordinary skill in the art.

The illustrative environment 100 includes at least one application server 108 and a data store 110. It should be understood that there may be several application servers, layers, or other elements, processes, or components, which may be chained or otherwise configured, which may interact to perform tasks such as obtaining data from an appropriate data store. As used herein the term "data store" refers to any device or combination of devices capable of storing, accessing, and/or retrieving data, which may include any combination and number of data servers, databases, data storage devices, and data storage media, in any standard, distributed, or clustered environment.

The application server 108 may include any appropriate hardware and software for integrating with the data store as needed to execute aspects of one or more applications for the client device 102, and may even handle a majority of the data access and business logic for an application. The application server 108 provides access control services in cooperation with the data store 110, and is able to generate content such as text, graphics, audio, and/or video to be transferred to the user, which may be served to the user by the Web server 106 in the form of HTML, XML, or another appropriate structured language in this example.

The handling of all requests and responses, as well as the delivery of content between the client device 102 and the application server 108, may be handled by the Web server 106. It should be understood that the Web and application servers 106, 108 are not required and are merely example components, as structured code discussed herein may be executed on any appropriate device or host machine as discussed elsewhere herein. Further, the environment 100 may be architected in such a way that a test automation framework may be provided as a service to which a user or application may subscribe. A test automation framework may be provided as an implementation of any of the various testing patterns discussed herein, although various other implementations may be utilized as well, as discussed or suggested herein.

The environment 100 may also include a development and/or testing side, which includes a user device 118 allowing a user such as a developer, data administrator, or tester to access the system. The user device 118 may be any appropriate device or machine, such as is described above with respect to the client device 102. The environment 100 may also include a development server 120, which functions similar to the application server 108 but typically runs code during development and testing before the code is deployed and executed on the production side and becomes accessible to outside users, for example. In some embodiments, an application server may function as a development server, and separate production and testing storage may not be utilized.

The data store 110 may include several separate data tables, databases, or other data storage mechanisms and media for storing data relating to a particular aspect. For example, the data store 110 illustrated includes mechanisms for storing production data 112 and user information 116, which may be utilized to serve content for the production side. The data store 110 also is shown to include a mechanism for storing testing data 114, which may be utilized with the user information for the testing side. It should be understood that there may be many other aspects that are stored in the data store 110, such as for page image information and access right information, which may be stored in any of the above listed mechanisms as appropriate or in additional mechanisms in the data store 110.

The data store 110 is operable, through logic associated therewith, to receive instructions from the application server 108 or development server 120, and obtain, update, or otherwise process data in response thereto. In one example, a user might submit a search request for a certain type of item. In this case, the data store 110 might access the user information 116 to verify the identity of the user, and may access the catalog detail information to obtain information about items of that type. The information then may be returned to the user, such as in a results listing on a Web page that the user is able to view via a browser on the user device 102. Information for a particular item of interest may be viewed in a dedicated page or window of the browser.

Each server typically will include an operating system that provides executable program instructions for the general administration and operation of that server, and typically will include a computer-readable medium storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment 100 in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 1. Thus, the depiction of the system 100 in FIG. 1 should be taken as being illustrative in nature, and not limiting to the scope of the disclosure.

Figure 2:
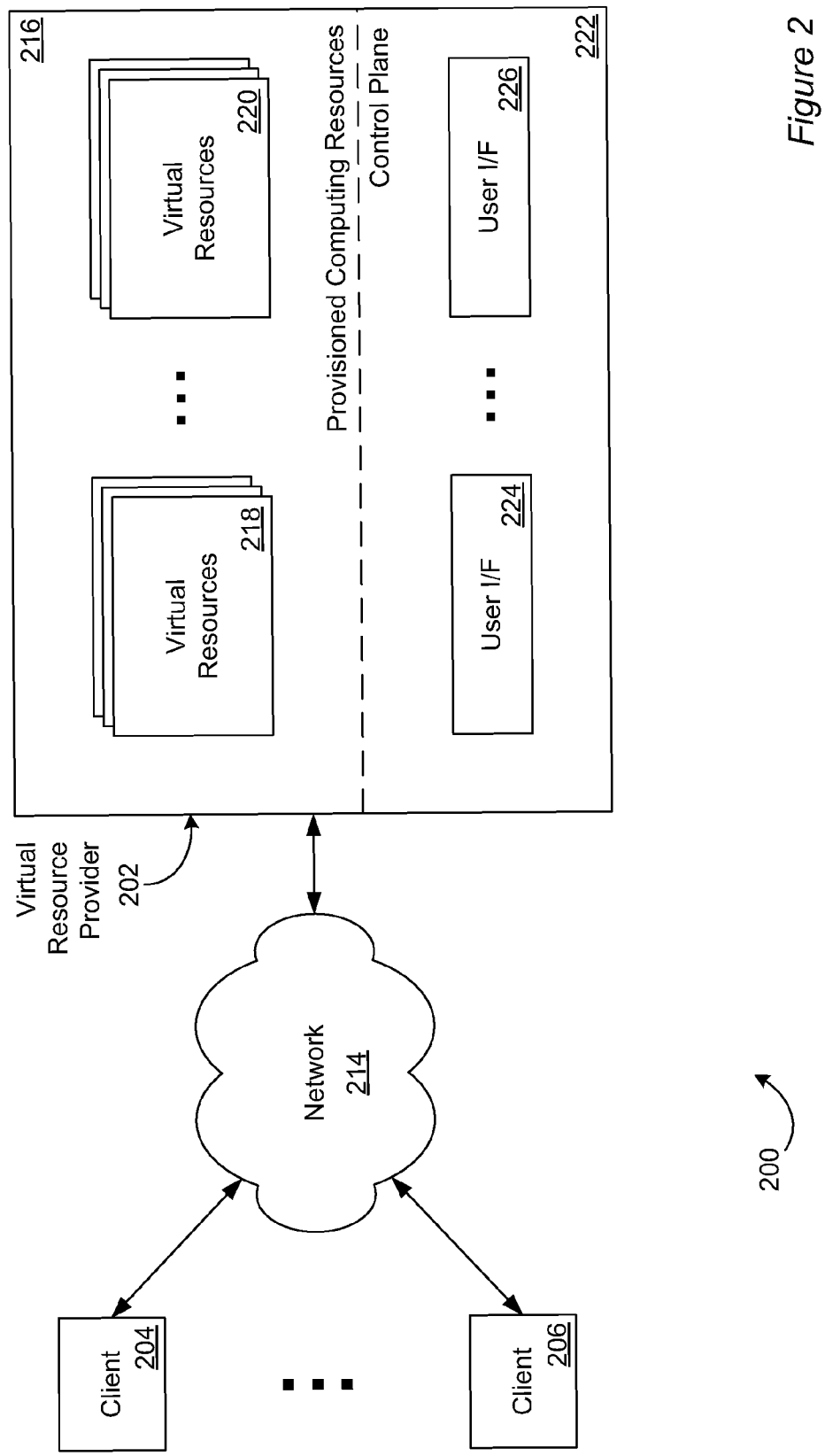
FIG. 2 is a schematic diagram depicting aspects of an example virtual computing resources architecture in accordance with at least one embodiment.

In at least one embodiment, one or more aspects of the environment 100 may incorporate and/or be incorporated into a virtual computing resources architecture. FIG. 2 depicts aspects of an example virtual computing resources architecture 200 in accordance with at least one embodiment. The example virtual computing resources architecture 200 includes a virtual resource provider 202 enabling various clients 204-206 to interact with provisioned computing resources 216 over a network 214. The provisioned computing resources 216 may include multiple types of virtual resource 218-220 such as virtual computing systems and clusters, virtual file system volumes, virtual private networks, data object stores, notification services, and suitable combinations thereof. The ellipsis between the types of virtual resource 218 and 220 indicates that the virtual resource provider 202 may maintain any suitable number of such computing resource types and/or instances. Ellipses are used similarly throughout the drawings.

Figure 3:
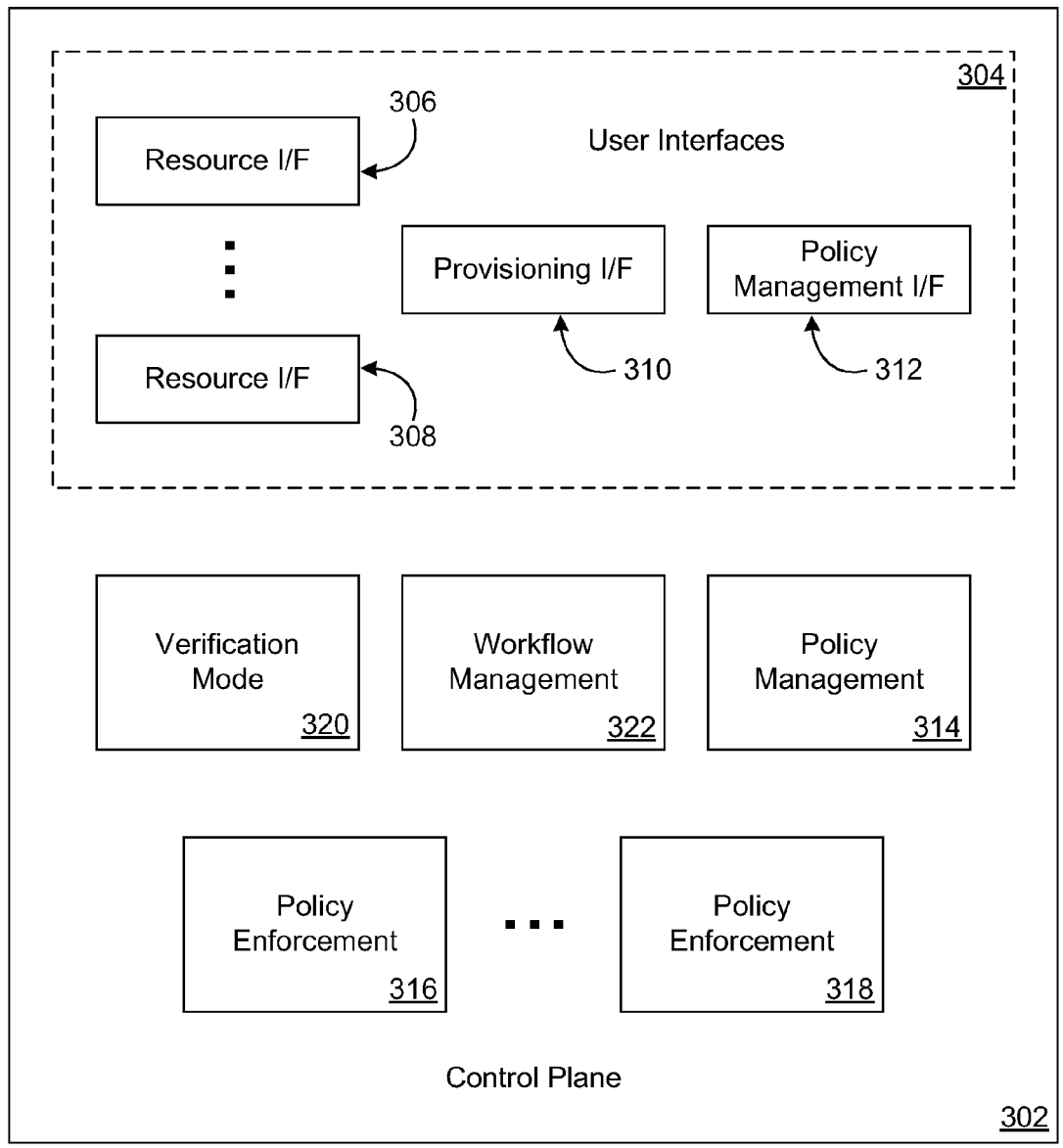
FIG. 3 is a schematic diagram depicting aspects of an example virtual resource provider control plane in accordance with at least one embodiment.

The virtual resource provider 202 may be implemented, at least in part, with server computers such as the Web server 106 and the application server 108 described above with reference to FIG. 1, and one or more data stores such as the data store 110 of FIG. 1, interconnected by a relatively high speed data network (not shown in FIG. 2). The server computers and/or data store(s) implementing the virtual resource provider 202 may include different types and/or configurations of server computers and/or data stores allocated to different virtual resource types 218-220 and to a control plane 222 of the virtual resource provider 202. The control plane 222 may include multiple user interfaces 224-226 that enable the clients 204-206 to interact with the virtual resource provider 202, including provisioning and interacting with the virtual resources 218-220, as well as setting policies with respect to the virtual resources 218-220. FIG. 3 depicts further aspects of a control plane 302 in accordance with at least one embodiment.

The user interfaces 304 of the control plane 302 may include any suitable type of user interface. For example, the user interface 304 may include graphical user interfaces (GUIs), Web-based interfaces, programmatic interfaces such as application programming interfaces (APIs) and/or sets of remote procedure calls (RPCs) corresponding to interface elements, messaging interfaces in which the interface elements correspond to messages of a communication protocol, and/or suitable combinations thereof. The user interfaces 304 may include multiple resource interfaces 306-308 enabling user interaction with the virtual resources 218-220 (FIG. 2). For example, there may be one of the resource interfaces 306-308 for each of the types of virtual resource 218-220. As another example, one or more of the resource interfaces 306-308 may enable interaction with multiple virtual resource types 218-220. Alternatively, or in addition, one or more of the types of virtual resource 218-220 may incorporate interfaces enabling direct interaction (e.g., by the clients 204-206) without mediation by one of the user interfaces 304.

The user interfaces 304 may further include a provisioning interface 310 enabling authorized users to provision, configure, re-configure and/or de-provision (collectively, "provision") the virtual resources 218-220 (FIG. 2). Although the example control plane 302 includes one such provisioning interface 310, embodiments may include any suitable number of such provisioning interfaces, including a provisioning interface for each type of virtual resource 218-220. Alternatively, or in addition, the resource interface 306 corresponding to a particular type of virtual resource 218 may incorporate the provisioning interface for that virtual resource type 218. The user interfaces 304 of the control plane 302 may still further include a policy management interface 312 enabling establishment, viewing, editing and/or deletion (collectively, "maintenance") of virtual resource provider 202 policies including policies with respect to the virtual resources 218-220 and with respect to policy management. Again, although the example control plane 302 includes one such policy management interface 312, embodiments may include any suitable number of policy management interfaces including a policy management interface for each type of virtual resource 218-220. The resource interface 306 corresponding to a particular type of virtual resource 218 may incorporate the policy management interface for that virtual resource type 218.

The control plane 302 may include a policy management component 314 configured at least to provide centralized policy management for the virtual resource provider 202 (FIG. 2). The policy management component 314 may receive user-specified policies, for example, specified with the policy management interface 312, and transform user-specified policies into a normal form. The policy management component 314 may then optimize the set of normal form policies, for example, for indexing and/or with respect to set size, and index the set of normal form policies based at least in part on one or more policy elements of the normal form. The policy management component 314 may then distribute the optimized normal form policies to a set of policy enforcement components 316-318 in a manner based at least in part on the index.

The control plane 302 may further include a verification mode component 320 configured at least to facilitate verification mode reporting. The verification mode component 320 may collect request evaluation results, normal form policies and/or decision data, map normal form policies to user-specified policies, and generate reports at specified levels of detail. For example, verification mode report detail levels may include a low detail level corresponding to an evaluation result and basic contextual information, a medium detail level that adds a set of policies considered to determine the evaluation result, a high detail level that further adds a set of decision data considered to determine the evaluation result, and a very high detail level that further adds virtual resource provider 202 (FIG. 2) operational information that may assist anomalous behavior diagnosis (e.g., debugging). For example, such operational information may include an identification of the set of policy enforcement components 316-318 involved in evaluating a request associated with the report. In at least one embodiment, verification mode may be a mechanism by which authorized users are permitted access to such virtual resource provider 202 operation information. Verification mode may correspond to a sandbox mode in the software development and/or testing sense, enabling configuration verification and/or testing without possible high cost consequences (e.g., in terms of financial and/or resource costs).

The verification mode component 320 may be further configured to process requests for verification mode tokens (e.g., cryptographic tokens), and to authenticate such tokens. For example, a verification mode token may be submitted with a request in order to indicate that the request is to be processed in verification mode. Alternatively, or in addition, verification mode tokens may authorize substitution of decision data (or at least a portion of the decision data) utilized when evaluating a request with respect to a set of policies. For example, the verification mode token may authorize substitution of decision data related to user identity, thus enabling an administrator to verify that a particular policy set has an intended effect with respect to a particular user.

The control plane 302 may include a workflow management component 322 configured at least to establish and maintain workflows such as resource workflows, provisioning workflows and/or policy management workflows established responsive to user interaction with the resource interfaces 306-308, the provisioning interface 310, and/or the policy management interface 312, respectively. Workflows may include one or more sequences of tasks to be executed to perform a job, such as virtual resource configuration, provisioning or policy management. A workflow, as the term is used herein, is not the tasks themselves, but a task control structure that may control flow of information to and from tasks, as well as the order of execution of the tasks it controls. For example, a workflow may be considered a state machine that can manage and return the state of a process at any time during execution. Workflows may be created from workflow templates. For example, a policy management workflow may be created from a policy management workflow template configured with parameters by the policy management component 314.

The workflow management component 322 may modify, further specify and/or further configure established workflows. For example, the workflow management component 322 may select particular implementation resources of the virtual resource provider 202 to execute and/or be assigned to particular tasks. Such selection may be based at least in part on the computing resource needs of the particular task as assessed by the workflow management component 322. As another example, the workflow management component 322 may add additional and/or duplicate tasks to an established workflow and/or reconfigure information flow between tasks in the established workflow. Such modification of established workflows may be based at least in part on an execution efficiency analysis by the workflow management component 322. For example, some tasks may be efficiently performed in parallel, while other tasks depend on the successful completion of previous tasks.

Figure 4:
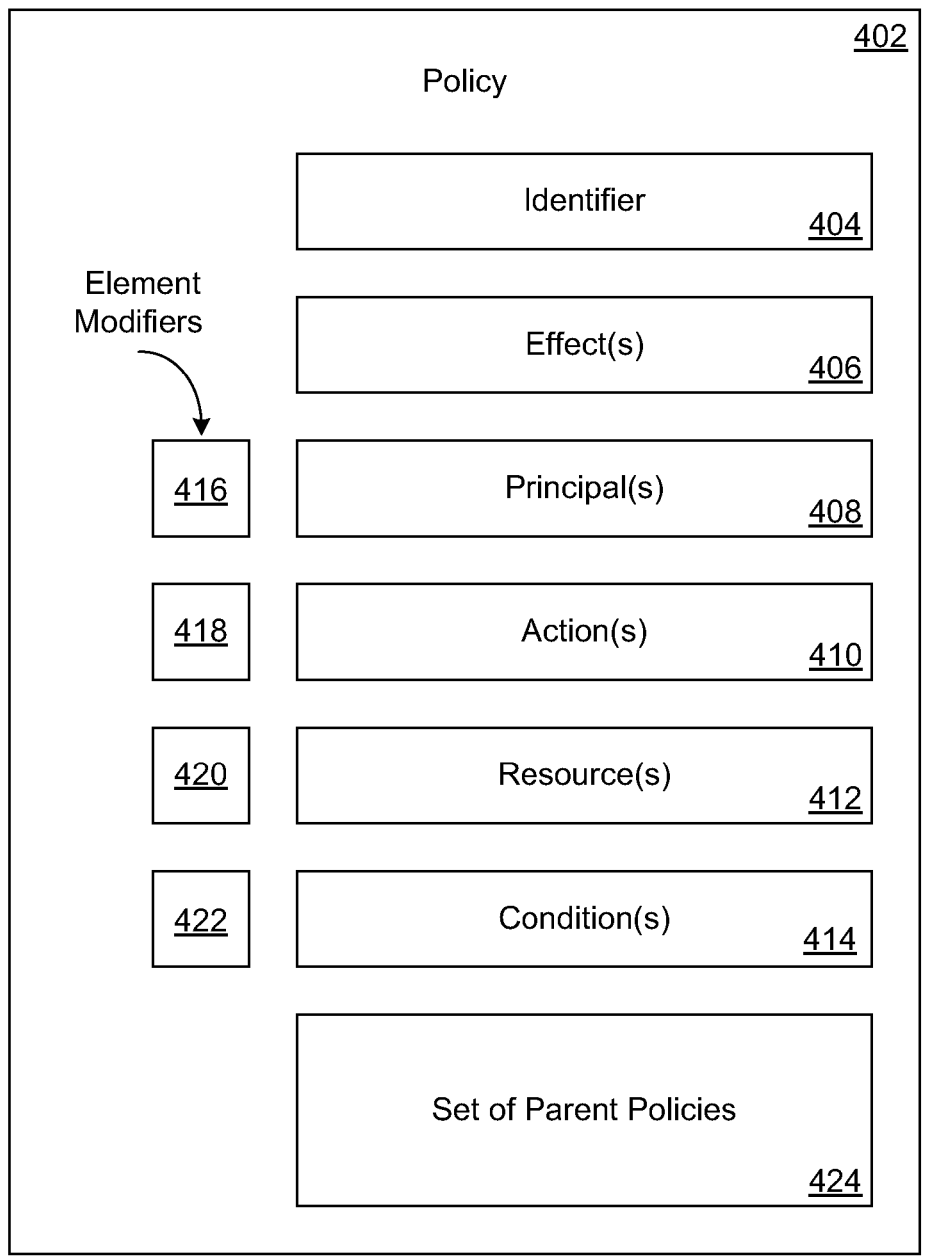
FIG. 4 is a schematic diagram depicting aspects of an example normal form policy in accordance with at least one embodiment.

The normal form of a policy may include a defined set of policy elements. FIG. 4 depicts aspects of an example normal form policy 402 in accordance with at least one embodiment. The policy 402 includes a policy identifier 404 uniquely identifying the policy 402, one or more effects 406 of the policy 402, reference to one or more principals 408 or actors governed by the policy, a specification of one or more actions 410 governed by the policy 402, reference to one or more resources 412 governed by the policy 402, a specification of one or more conditions 414 to be satisfied before the policy 402 is enforced, and a set of element modifiers 416, 418, 420, 422 corresponding to the policy elements 408, 410, 412, 414, respectively. The policy 402 may have an alphanumeric and/or Unicode representation and/or encoding sometimes called the policy document.

The policy identifier 404 may be any suitable identifier uniquely identifying the policy 402. For example, the policy identifier 404 may correspond to an alphanumeric and/or Unicode (collectively, "alphanumeric") string or integer number. The policy identifier 404 may be utilized to reference the policy 402. Examples of policy effects include permit and deny. The effect(s) 406 element of the policy 402 may specify such policy effects. For example, a particular policy may permit one or more principals 408 to take one or more actions 410 with respect to one or more resources 412, while another policy may deny a set of actions 410 to a set of principals 408.

The principal(s) 408 element of the policy 402 may specify one or more entities known to the virtual resource provider 202 (FIG. 2) that are capable of making requests of the virtual resource provider 202. Such entities may include users having a user account with the virtual resource provider 202, customers having a commercial account (e.g., a cost-tracking account) with the virtual resource provider 202, and groups of users and/or customers including role-based groups such as administrators. Virtual machine instances or other virtual resources, other resources, and/or groups thereof may be also be principals. Such entities may be specified with any suitable identifier including user identifiers, customer account numbers, group identifiers, and alphanumeric strings.

The action(s) 410 element of the policy 402 may specify one or more actions capable of being performed by the virtual resource provider 202 (FIG. 2). Such actions may include actions capable of being performed by the virtual resources 218-220 of the virtual resource provider 202 and/or actions that may be requested with the user interfaces 224-226 of the virtual resource provider 202, including policy management actions. In at least one embodiment, actions specified by the action(s) 410 element correspond to elements of the user interfaces 224-226. Such actions may be specified with any suitable action identifier including interface element identifiers and alphanumeric strings.

The resource(s) 412 element of the policy 402 may specify one or more resources of the virtual resource provider 202 (FIG. 2) for which one or more of the action(s) 410 is valid. Such resources may include virtual resources 218-220, implementation resources, policies, and verification mode tokens. Such resources may be specified with any suitable resource identifier including resource identifiers in accordance with a uniform resource identifier (URI) standard such as Berners-Lee et al., "Uniform Resource Identifier (URI): Generic Syntax," Request for Comments (RFC) 3986, Network Working Group, January 2005.

The condition(s) 414 element of the policy 402 may specify a set of conditions to be satisfied before the policy 402 is enforced. For example, the condition(s) 414 may specify the conditions under which the principal(s) 408 are permitted to perform the action(s) 410 with respect to the resource(s) 412. Such conditions may be specified with any suitable condition specification language including suitable programming languages, and may include compound conditions, for example, specified with Boolean operators. Condition parameters may include any suitable data available to the virtual resource provider 202 (FIG. 2). Condition parameter examples include environmental data such as calendar date and time of day, and request-associated data such as originating network address, originating geographical location, originating political and/or administrative division and communication protocol employed.

By default, the policy 402 effect(s) 406 may be enforced when the specified principal(s) 408 request the specified action(s) 410 with respect to the specified resource(s) 412 and the specified set of condition(s) 414 are satisfied. However, the element modifiers 416-422 may indicate that the corresponding policy elements 408-414 specify exceptions. That is, that the policy 402 effect(s) 406 be enforced unless the specified principal(s) 408 are the actors, unless the specified action(s) 410 are requested, unless the specified resource(s) 412 are the subject of action and/or unless the specified set of conditions is satisfied. In addition, policy element 408-414 specifications may include "wildcard" values. For example, a '*' wildcard value may match all and/or any valid values of the policy element 408-414. Alternatively, or in addition, wildcard values may be matched contextually. For example, a '*' wildcard value may match all and/or any values of the policy element 408-414 that are valid with respect to a particular user, customer, group, and/or other context of a particular request.

As described above with reference to FIG. 3, the policy management component 314 may transform user-specified policies into normal form policies, and optimize sets of normal form policies. The optimized set of normal form policies may differ significantly from the supplied set of user-specified policies. A single user-specified policy can result in the addition of multiple normal form policies. A single normal form policy can participate in enforcing multiple user-specified policies. In at least one embodiment, each normal form policy 402 maintains a set of references to "parent" policies 424 which the normal form policy 402 participates in enforcing. For example, the set of parent policies 424 may be updated during user-specified policy transformation and normal form policy set optimization operations.

Figure 5:
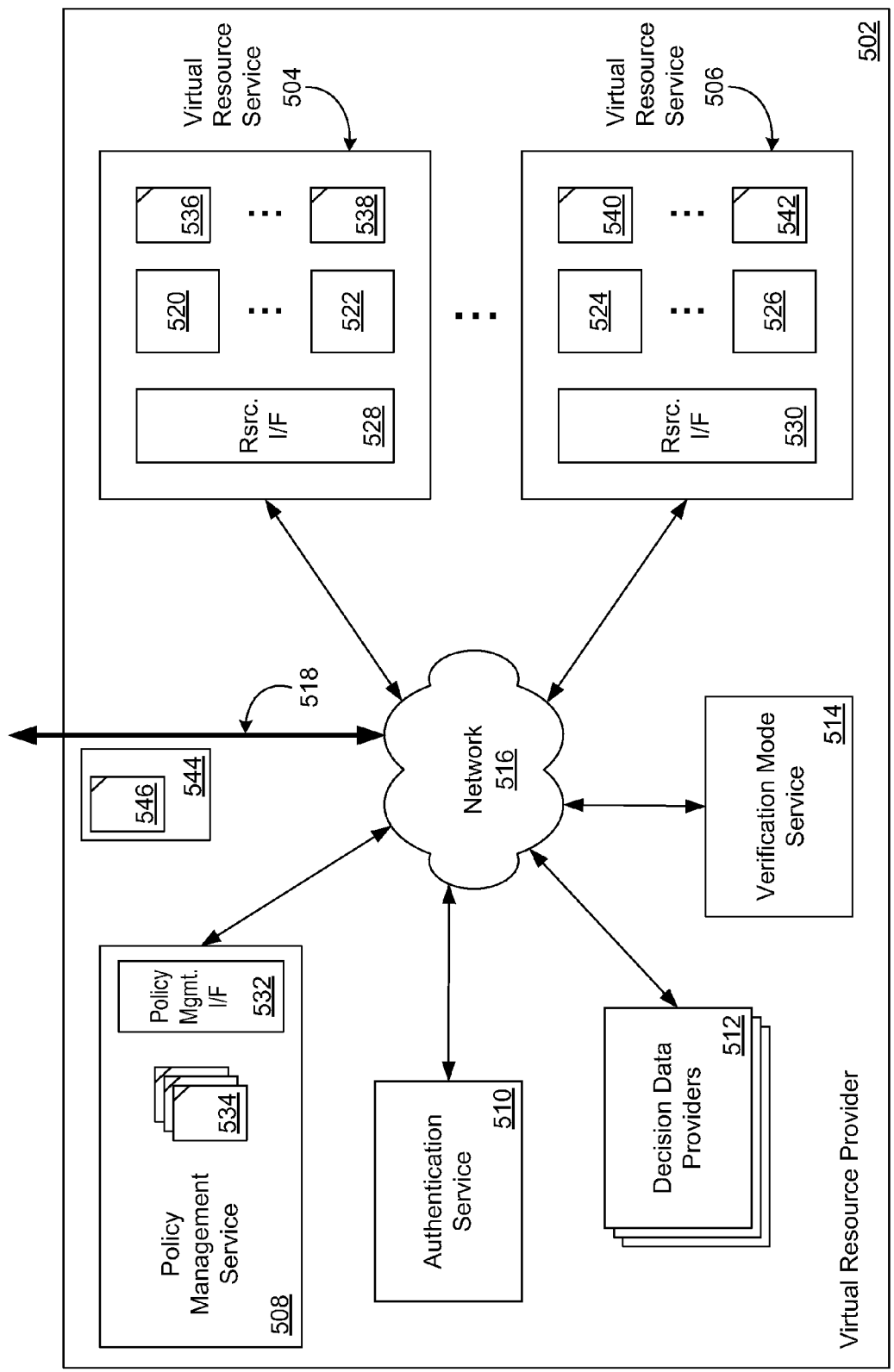
FIG. 5 is a schematic diagram depicting aspects of an example virtual resource provider in accordance with at least one embodiment.

The virtual resource provider 202 may be implemented as a collection of networked services. FIG. 5 depicts aspects of an example virtual resource provider 502 implemented in accordance with at least one embodiment. The virtual resource provider 502 includes multiple virtual resource services 504-506, a policy management service 508, an authentication service 510, a set of decision data providers 512, and a verification mode service 514, each interconnected by a network 516. The arrow 518 indicates that the network 516 is connected to the network 214 of FIG. 2.

Each virtual resource service 504, 506 may maintain a set of provisioned resources 520-522, 524-526 and incorporate a resource interface 528, 530. For example, each virtual resource service 504-506 may maintain one type of virtual resource 218-220 as described above with reference to FIG. 2, and incorporate a corresponding one of the resource interfaces 306-308 described above with reference to FIG. 3. The policy management service 508 may incorporate a policy management interface 532 corresponding to the policy management interface 312 of FIG. 3.

The policy management service 508 may act as a centralized policy management service for the virtual resource provider 502, managing, transforming, optimizing and distributing one or more sets of policies 534 to other services 504-506, 510-514 of the virtual resource provider 502. In addition, in at least one embodiment, services 504-506, 510-514 of the virtual resource provider 502 other than the policy management service 508 may maintain policies. For example, the virtual resource services 504-506 may each maintain a set of policies 536-538, 540-542 that are relevant to the respective set of provisioned resources 520-522, 524-526. Such policies 536-538, 540-542 may be established, viewed, edited and deleted with policy management interface 312 (FIG. 3) functionality integrated into the associated resource interface 528-530. Such policies 536-538, 540-542 may be compatible with the policies 534 maintained by the policy management service 508. For example, the policies 536-538, 540-542 may each have a form corresponding to the normal form policy 402 (FIG. 4). Further in addition, in at least one embodiment, policies may be maintained at a location external to the virtual resource provider 502, and supplied for enforcement as part of interactions with the services 504-514 of the virtual resource provider 502. For example, request 544 incorporates such a policy 546.

The authentication service 510 may provide authentication services for the virtual resource provider 502. For example, the authentication service 410 may authenticate an integrity and/or an authenticity of policies 534-542, 546. In addition, the authentication service 510 may authenticate an identity of clients 204-206 (FIG. 2), customers and/or users of the virtual resource provider 502. For example, the policy management interface 532 and/or the resource interfaces 528-530 may utilize the authentication service 510 to establish and/or verify an identify and/or authority of a user with respect to policies 534-542, 546 and/or provisioned resources 520-526. The authentication service 510 may utilize any suitable authentication mechanism, including any suitable cryptographic authentication mechanism, to provide the authentication services. Such authentication mechanisms are well known in the art and need not be detailed here.

The decision data providers 512 may provide data required by policy enforcement components 316-318 (FIG. 3) to evaluate requests that are subject to policies. For example, the provisioned resources 520-526 may be associated with various labeling and/or naming schemes ("resource names"), and the decision data providers 512 may include a name resolution provider that maps or resolves such resource names to locations (e.g., network locations) within the virtual resource provider 502. The decision data providers 512 may further include providers of data required to determine whether the condition(s) 414 (FIG. 4) of the policy 402 are satisfied. For example, a particular policy may deny interaction with a particular resource from a specified set of geographic locations and/or regions (collectively, "geographic locations"). In such a case, the decision data providers 512 may include a geographic resolution provider capable of identifying a set of geographic locations associated with the request 544.

The verification mode service 514 may provide verification mode functionality (e.g., as described above with reference to the verification mode component 320 of FIG. 3) as a service to the other services 504-512 of the virtual resource provider 502. For example, the resource interfaces 528-530 and/or the policy management interface 532 may query the verification mode service 514 to authenticate a verification mode token and/or may provide evaluation results for reporting in response to a request. An example verification mode service is described below in more detail with reference to FIG. 7. However, the description first turns to further aspects of the policy management service 508 in accordance with at least one embodiment.

Figure 6:
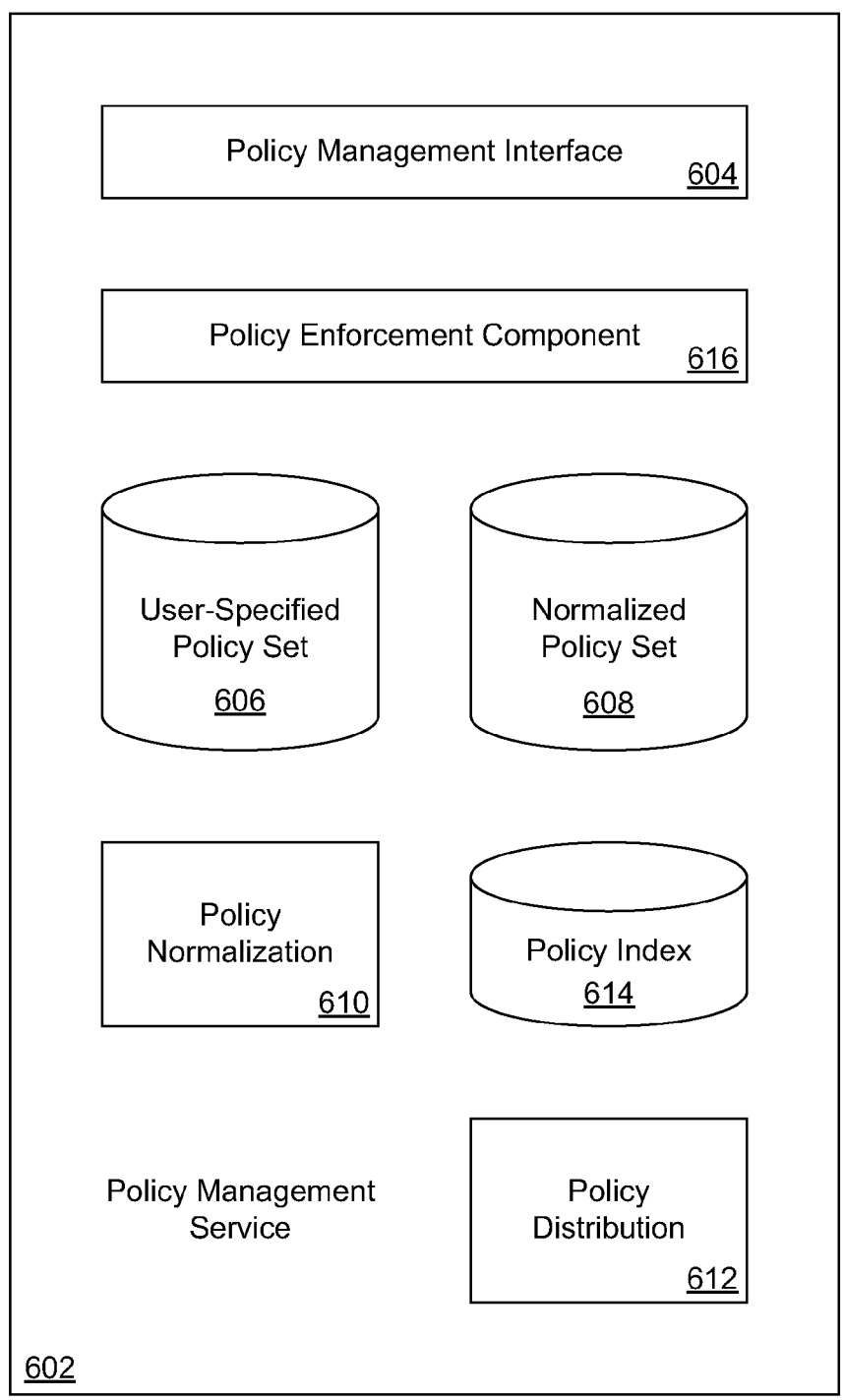
FIG. 6 is a schematic diagram depicting aspects of an example policy management service in accordance with at least one embodiment.

The policy management service 602 of FIG. 6 is an example of the policy management service 508 of FIG. 5, and includes a policy management interface 604 corresponding to the policy management interface 532 of FIG. 5. Users of the virtual resource provider 502 may interact with the policy management interface 604 to specify, view, edit and/or delete policies in a user-specified policy set 606 maintained by the policy management service 602. The policy management service 602 may further maintain a normalized policy set 608 corresponding to the user-specified set 606. The normalized policy set 608 may be maintained by a policy normalization component 610. The policy management service 602 may participate in policy enforcement, for example, the policy management service 602 may include a policy enforcement component 616 corresponding to one of the policy enforcement components 316-318 of FIG. 3. In particular, the policy enforcement component 616 may enforce policies referencing actions that may be requested with the policy management interface 604. Furthermore, in at least one embodiment, at least a portion of the normalized policy set 608, or a copy thereof, is distributed to policy enforcement components located throughout the virtual resource provider 502. The policy management service 602 may include a policy distribution component 612 configured at least to distribute the normalized policy set 608 throughout the virtual resource provider 502, for example, based at least in part on a policy index 614.

Policies in the user-specified policy set 606 may be specified with alphanumeric strings. A first example of such a policy is:
permit administrators*
corresponding to permission for members of the group with identifier "administrators" to perform all actions with respect to all resources associated with a particular virtual resource provider 502 (FIG. 5) customer account. A second example is:
deny jsmith*unless current_time in business_hours
corresponding to denying permission for a user with identifier "jsmith" to perform any action outside of business hours. A third example is:
permit jsmith to {create, read, write, delete} data_object_service:zone_1::/public/images
corresponding to permission for the user with identifier "jsmith" to create, read, write and delete data objects at a particular virtual resource having resource identifier "data_object_service:zone_1::/public/images". A fourth example is:

permit msmith to configure {vcs::/example_corp/*, bds::/example_corp/*} corresponding to permission for a user with identifier "msmith" to configure all virtual computer systems (provided by a virtual computing service "vcs") and block data volumes (provided by a block data service "bds") associated with a customer having customer identifier "example_corp". Each user-specified policy may be associated with a unique identifier.

The policy normalization component 610 may generate sets of normalized policies corresponding to user-specified policies, and store the normalized policies in the normalized policy set 608. For example, each policy in the normalized policy set 608 may have a form corresponding to the normal form policy 402 of FIG. 4. The policy normalization component 610 may generate multiple normal form policies corresponding to a user-specified policy, for example, due to decompounding with respect to policy elements 408-414. The fourth user-specified policy example described above may be decompounded to generate two normal form policies, both with the effect 406 element specifying a permit effect, the principal 408 element specifying the user with identifier "msmith", and the action 410 element specifying the configure action. For example, the resource 412 element of one of the normal form policies may specify all virtual computer systems associated with the customer identifier "example_corp", the resource 412 element of the other of the normal form policies may specify all block data volumes associated with the customer identifier "example_corp". In this example, the user-specified policy has been decompounded with respect to the resource 412 element. As another example, the policy normalization component 610 may be configured to decompound the first user-specified policy example described above with respect to the action 410 element and/or the resource 412 element.

Wildcards may be first "expanded" into a set of values, for example, based on a context of the user-specified policy, before being decompounded. The decompounding need not be complete with respect to policy element 408-414 (FIG. 4) values. For example, the policy normalization component 610 may be configured to protect particular subsets of policy element 408-414 values (policy element "atoms" or "indivisibles") from decompounding. As one example, the set of actions corresponding to "{create, read, write, delete}" may be protected from decompounding.

The policy normalization component 610 may reduce a size of the normalized policy set 608, for example, by reducing redundancy in the normalized policy set 608. The policy normalization component 610 may detect that a newly added normal form policy is contained within the scope of one or more of the normalized policy set 608, and delete the newly added normal form policy from the normalized policy set 608. Normal form policies, such as the normal form policy 402 of FIG. 4, may correspond to sets of points in one or more policy spaces, for example, spaces having dimensions corresponding to the policy elements 408-414 of the normal form, and/or Boolean-valued functions over the policy spaces. Each effect 406 element value may correspond to such a policy space. For example, there may be a permit space and a deny space. The policy enforcement components 316-318 (FIG. 3) may be configured to require an explicit permit in the absence of a deny in order to permit a particular action, that is, to require a point in a permit space without a corresponding point in the deny space. Wildcards may correspond to regions of such policy spaces. Element modifiers 416-422 may be used to define complimentary sets of the policy spaces. The policy normalization component 610 may detect whether the normal form policy 402 is within in the scope of a set of normal form policies (e.g., the normalized policy set 608) by determining whether the set of points corresponding to the normal form policy 402 is contained within the set of points corresponding to the set of normal form policies.

The policy normalization component 610 may further reduce the size of the normalized policy set 608 by compounding and/or recompounding normal form policies in the normalized policy set 608 with respect to policy elements 408-414 (FIG. 4). Some policy element 408-414 values may correspond to multiple other policy element 408-414 values, so that a single normal form policy 402 may correspond to a same policy space region as multiple other normal form policies. For example, a principal 408 element value corresponding to a group may be equivalent to multiple principal 408 element values corresponding to individual users. The policy normalization component 610 may be configured to detect compoundable subsets of the normalized policy set 608 and to compound the detected subsets along policy element 408-414 dimensions to configured granularities (which need not be the coarsest available granularity). Throughout generation and/or transformation of the normalized policy set 608, the policy normalization component 610 may be configured to maintain the set of parent policies 424 of each normal form policy 402. For example, the set of parent policies 424 may include the identifier of each user-specified policy that the normal form policy 402 participates in enforcing.

Different regions of the policy space(s) may be enforced by different policy enforcement components 316-318 (FIG. 3). Different policy enforcement components 316-318 may enforce overlapping, and even same, regions of the policy space(s). However, in at least one embodiment, different policy enforcement components 316-318 enforce disjoint regions of the policy space(s). The policy distribution component 612 may determine regions of the policy space(s), and corresponding subsets of the normalized policy set 608, to assign and/or distribute to the policy enforcement components 316-318. To facilitate such distribution, the policy distribution component 612 may establish and maintain the policy index 614. The policy index 614 may index the normalized policy set 608 with respect to policy element 408-414 (FIG. 4) values and/or subsets thereof. For example, the policy index 614 may index the normalized policy set 608 with respect to resource 412 and/or resource 412 type. Policies in the normalized policy set 608 may be multiply indexed, for example, with respect to multiple different policy element 408-414 values and/or value subsets. The policy distribution component 612 may distribute the normalized policy set 608 to the policy enforcement components 316-318 based at least in part on the policy index 614. For example, sets of indices of the policy index 614 may define policy enforcement domains corresponding to subsets of the normalized policy set 608, and the policy distribution component 612 may distribute such subsets to the policy enforcement components 316-318 as units. In at least one embodiment, each normal form policy 402 incorporates its indexing information and/or the policy index 614 is incorporated into the normalized policy set 608.

Figure 7:
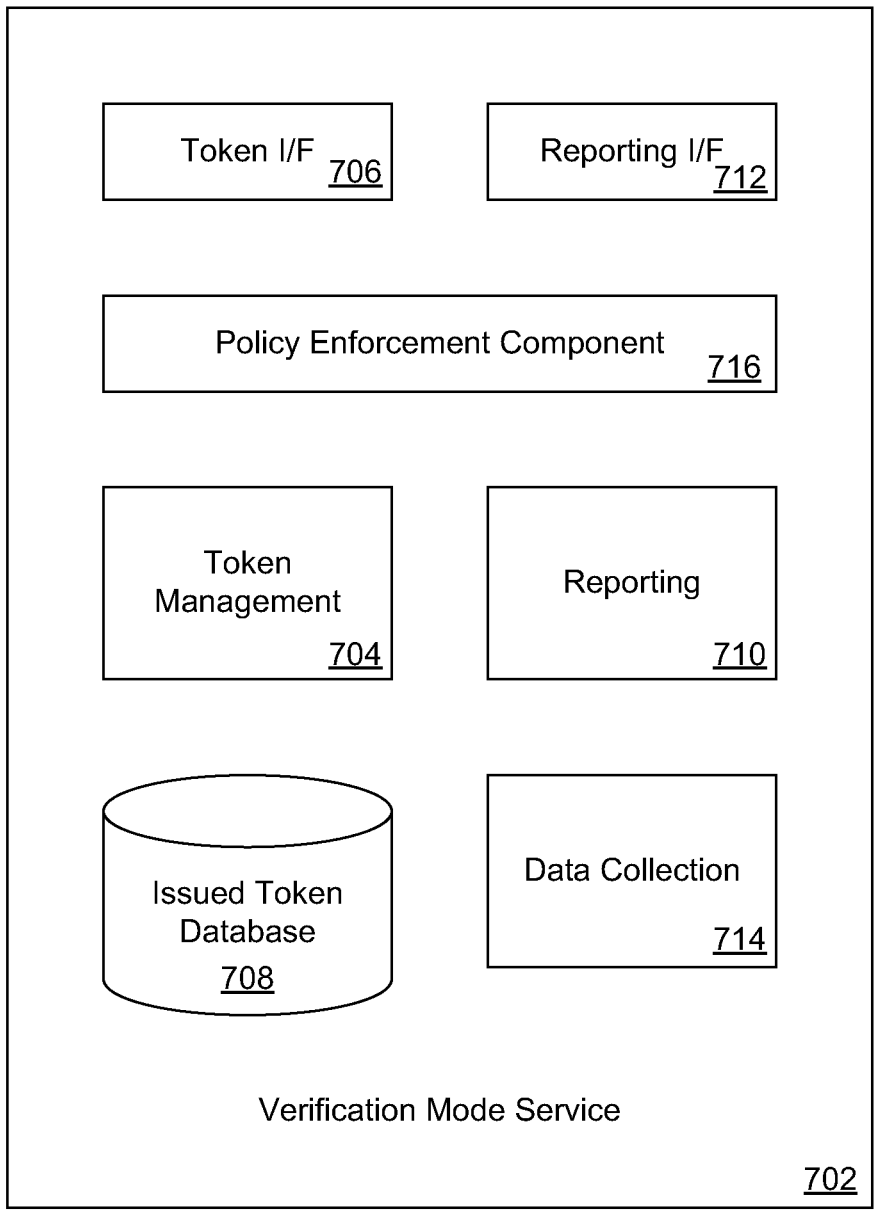
FIG. 7 is a schematic diagram depicting aspects of an example verification mode service in accordance with at least one embodiment.

The distributed nature of policy enforcement in the virtual resource provider 502 (FIG. 5) can complicate efforts to verify that a particular set of user-specified polices has its intended consequences. FIG. 7 depicts aspects of an example verification mode service 702 in accordance with at least one embodiment that can facilitate such verification. The verification mode service 702 may include a token management component 704 accessible through a token interface 706. The token management component 704 may issue verification mode tokens in response to authorized requests, record the issued tokens in an issued token database 708, and authenticate the issued tokens upon request. Following processing of the request 544 in verification mode, a reporting component 710 of the verification mode service 702 may prepare a verification mode report at a specified level of detail. Requests for such reports, as well as level of detail specification, may be made with a reporting interface 712 of the verification mode service 702. Such report requests may not include all the data required by the reporting component 710. The verification mode service 702 may further include a data collection component 714 configured to interact with other services 504-512 of the virtual resource provider 502 to obtain the required data.

Policies with respect to actions that may be requested with the token interface 706 and/or the reporting interface may be enforced by a policy enforcement component 716 corresponding to one of the policy enforcement components 316-318 of FIG. 3. For example, such policies may define a set of users of the virtual resource provider 502 (FIG. 5) authorized to be issued verification mode tokens, and may require an authentic verification mode token before providing the verification mode report. The token management component 704 may issue multiple types of tokens, for example, tokens authorizing verification mode reporting may be a separate type from tokens authorizing substitution of decision data during verification mode processing of the request 544. Tokens authorizing substitution of different subsets and/or types of decision data may also be separate types. Verification mode policies may distinguish between different types of tokens. Generation, issuance, authentication and revocation of cryptographic tokens are well known in the art, and need not be described here in detail.

Requests at the reporting interface 712 may specify a type of report and/or level of reporting detail. For example, the workflow management component 322 (FIG. 3) may generate the request in response to detecting a verification mode request at one of the resource interfaces 306-308. The reporting component 710 may generate the requested report based on a corresponding report template, utilizing the data collection component 714 to collect data as necessary. Fields that may be included in the verification mode report include one or more results of evaluation of the verification mode request by one or more of the policy enforcement components 316-318, a subset of the normalized policy set 608 (FIG. 6) and/or the user-specified policy set 606 relevant to the verification mode request and/or utilized during the evaluation by the one or more policy enforcement components 316-318, decision data utilized during the evaluation, virtual resource provider 502 contextual operating data capable of influencing the evaluation, and/or versions thereof filtered and/or summarized to the specified level of detail. The reporting component 710 may be configured to map a set of normal form policies to a corresponding set of user-specified policies based at least in part on the set of parent policies 424 (FIG. 4) referenced by each normal form policy 402.

Figure 8:
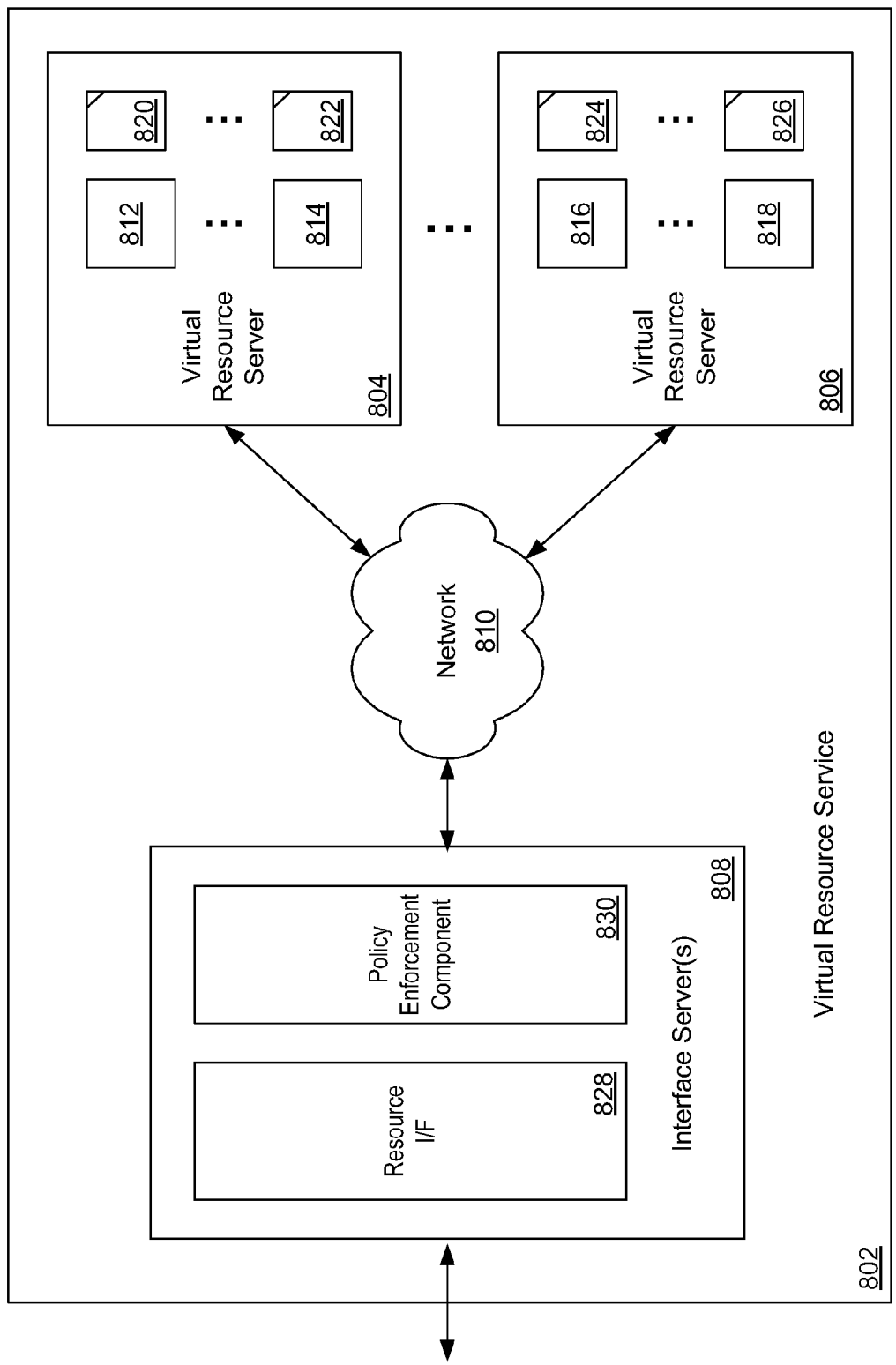
FIG. 8 is a schematic diagram depicting aspects of an example virtual resource service in accordance with at least one embodiment.

Each virtual resource service 504-506 (FIG. 5) may be implemented with a collection of physical server computers and/or network elements. FIG. 8 depicts aspects of an example virtual resource service 802 in accordance with at least one embodiment. The virtual resource service 802 depicted in FIG. 8 is an example of the virtual resource service 504 of FIG. 5. The example virtual resource service 802 includes multiple virtual resource servers 804-806 and one or more interface servers 808 interconnected by a network 810. The provisioned resources 520-522 and policies 536-538 of FIG. 5 may be distributed across the virtual resource servers 804-806 of FIG. 8 utilizing any suitable data distribution technique. For example, each virtual resource server 804, 806 may maintain a subset 812-814, 816-818 of the provisioned resources 520-522, and a corresponding subset 820-822, 824-826 of the policies 536-538. Such subsets may deliberately overlap for various purposes including data durability and service capability.

The interface server(s) 808 may (collectively) maintain a resource interface 828 and a policy enforcement component 830. The resource interface 828 may correspond to one of the resource interfaces 306-308 of FIG. 3. Similarly, the policy enforcement component 830 may correspond to one of the policy enforcement components 316-318 of FIG. 3. The policy enforcement component 830 of FIG. 8 may enforce policies referencing actions that may be requested with the resource interface 828 of FIG. 8. Such policies may include policies distributed by the policy management service 602 (FIG. 6), policies 820-826 stored on the virtual resource servers 804-806, and policies accompanying requests to the resource interface 828 such as the policy 546 of FIG. 5. For example, the resource interface 828 may require a "permit" evaluation by the policy enforcement component 830 before further processing a request.

Figure 9:
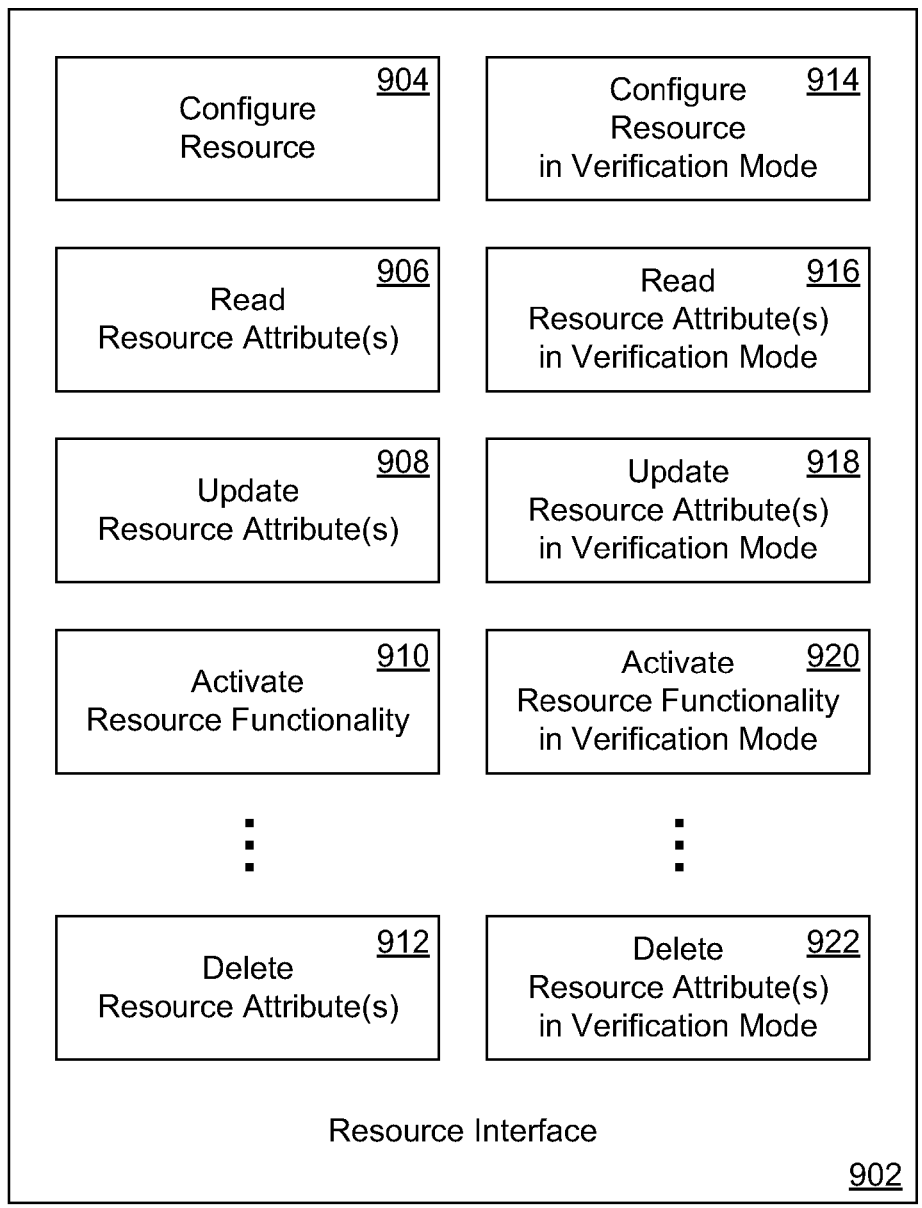
FIG. 9 is a schematic diagram depicting aspects of an example resource interface in accordance with at least one embodiment.

FIG. 9 depicts aspects of an example resource interface 902 in accordance with at least one embodiment. The resource interface 902 may include any suitable number of interface elements of any suitable type. In this example, the resource interface 902 includes a configure resource interface element 904, a read resource attribute(s) interface element 906, an update resource attribute(s) interface element 908, an activate resource functionality interface element 910, and a delete resource attribute(s) interface element 912. In addition, the resource interface 902 includes distinct interface elements 914-922 corresponding to verification mode versions of the interface elements 904-912. Each interface element 904-922 defines a structured interaction with the provisioned resources 812-818 (FIG. 8) including a request to perform a set of actions with respect to at least one of the provisioned resources 812-818. In the example resource interface 902, each interface element 904-922 corresponds to a set of messages of a Web-based services protocol such as extensible markup language (XML) encoded remote procedure calls (e.g., XML-RPC) or a simple object access protocol (e.g., SOAP).

Clients 204-206 (FIG. 2) may utilize the configure resource interface element 904 to request a configuration and/or reconfiguration of one or more of the provisioned resources 812-818 (FIG. 8). For example, if the provisioned resources 812-818 include data object stores, the configure resource interface element 904 may enable clients 204-206 to set a maximum size of a data object store over which they have authority. Clients 204-206 may utilize the read resource attribute(s) interface element 906 to request a read or view of one or more attributes of one or more of the provisioned resources 812-818. For example, the read resource attribute(s) interface element 906 may enable clients 204-206 to obtain copies of specified data objects from specified data object stores. Clients 204-206 may utilize the update resource attribute(s) interface element 908 to request an update of one or more attributes of one or more of the provisioned resources 812-818. For example, the update resource attribute(s) interface element 908 may enable clients 204-206 to update specified data objects and/or create specified data objects in specified data object stores.

Some provisioned resources 812-818 (FIG. 8) may have functionality that can be activated, and the activate resource functionality interface element 910 may be utilized to request an activation of that functionality. For example, some types of data object store may have a capability to analyze stored data objects, and the activate resource functionality interface element 910 may enable authorized clients to start, stop, suspend and/or perform the analysis. The delete resource attribute(s) interface element 912 may enable clients 204-206 (FIG. 2) to request a deletion and/or re-initialization of one or more attributes of one or more of the provisioned resources 812-818. For example, clients 204-206 with sufficient authorization may delete specified data objects from specified data object stores.

In the example resource interface 902, utilization of the verification mode versions 914-922 of the interface elements 904-912 indicates that the corresponding request is to be processed in the verification mode (is a "verification mode request"). For example, the resource interface 828 (FIG. 8) may submit the request to the policy enforcement component 830 as usual, but inhibit any actions that would usually result from a "permit" evaluation result. Regardless of the evaluation result, the resource interface 828 may respond to the request with a verification mode report. For example, the resource interface 828 and/or a controlling workflow may invoke an interface element of the verification mode reporting interface 712 (FIG. 7) to generate the verification mode report. The use of dedicated interface elements 914-922 is only one technique for indicating that a request is to be processed in verification mode. Alternate embodiments may utilize any suitable technique. For example, interface elements 904-912 may incorporate an explicit indicator (e.g., a "flag") for indicating the request is a verification mode request. The resource interface 902 may include an explicit set of interface elements (not shown in FIG. 9) for activating and deactivating verification mode processing. As a further alternative, or in addition, receipt of a verification mode token (e.g., issued by the verification mode service 702) may act as an indication that an associated request is to be processed in verification mode.

Figure 10:
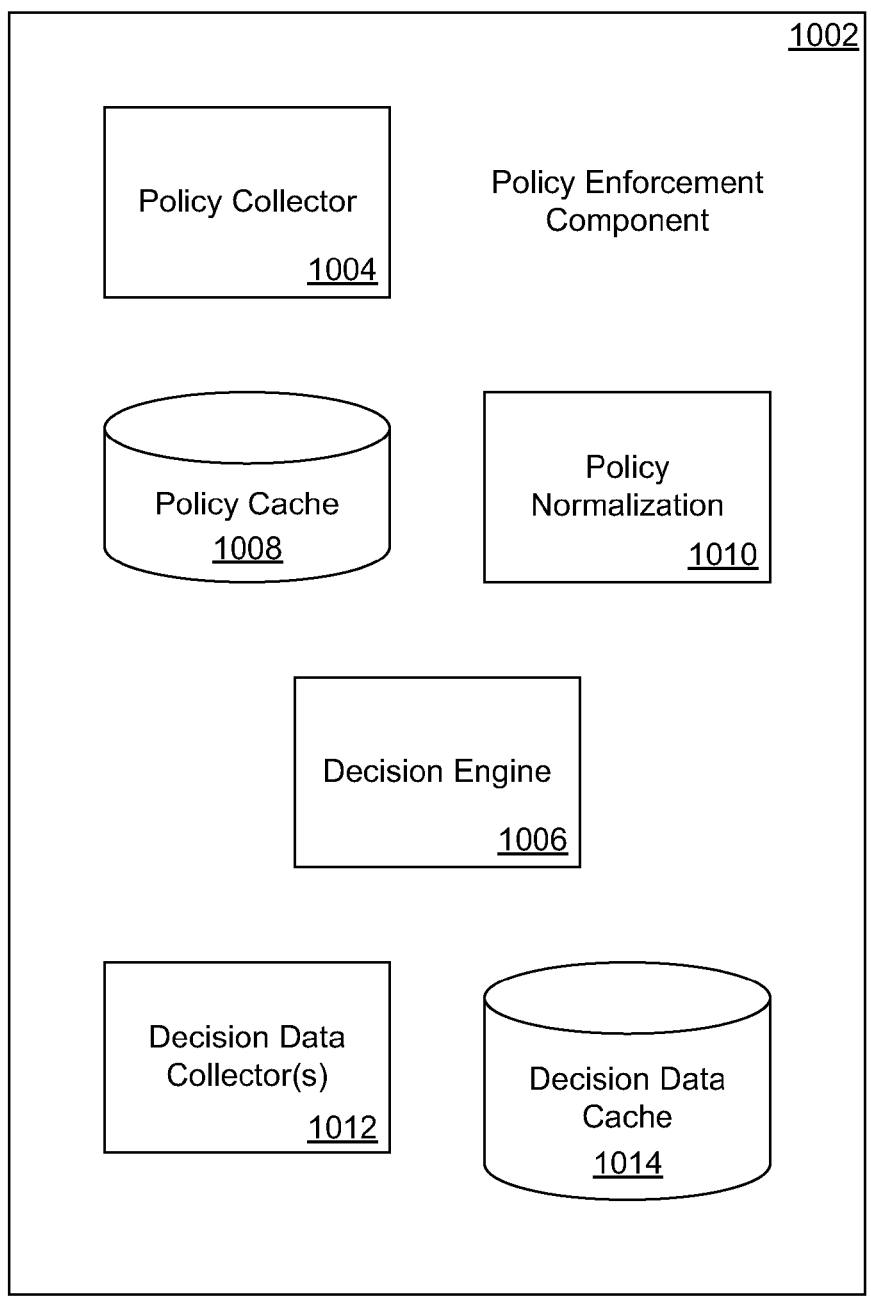
FIG. 10 is a schematic diagram depicting aspects of an example policy enforcement component in accordance with at least one embodiment.

Each interface element 904-922 may correspond to a request (e.g., the request 544 of FIG. 5) subject to a subset of the policies 534-542, 546. In order to evaluate the request with respect to the subset of the policies 534-542, 546, the resource interface 828 (FIG. 8) receiving the request may submit the request to the policy enforcement component 830. FIG. 10 depicts aspects of an example policy enforcement component 1002 in accordance with at least one embodiment. The policy enforcement component 1002 of FIG. 10 is an example of the policy enforcement component 830 of FIG. 8.

The policy enforcement component 1002 may include a policy collector 1004 configured at least to collect relevant policies 534-542, 546 (FIG. 5) from locations throughout the virtual resource provider 502, and store them local to a decision engine 1006 in a policy cache 1008. Collected policies may not be in normal form 402 (FIG. 4). The policy enforcement component 1002 may further include a policy normalization component 1010 having functionality corresponding to that of the policy normalization component 610 (FIG. 6) of the policy management service 602. The policy normalization component 1010 may normalize the set of policies in the policy cache 1008. The decision engine 1006 may evaluate requests submitted to the policy enforcement component 1002 with respect to relevant policies in the policy cache 1008. At times, additional data may be required to support particular decisions with respect to particular policies. The policy enforcement component 1002 may still further include one or more decision data collectors 1012 configured at least to collect the required decision support data ("decision data") from locations throughout the virtual resource provider 502. Collected decision data may be stored local to the decision engine 1006 in a decision data cache 1014.

The policy collector 1004 may update the policy cache 1008 responsive to policy update notifications, for example, received from the policy management service 602 (FIG. 6) and/or the virtual resource servers 804-806 (FIG. 8). The policy collector 1004 may subscribe to notifications of updates to relevant policies and/or policy sets maintained at the policy management service 602 and/or the virtual resource servers 804-806. Alternatively, or in addition, the policy collector 1004 may periodically search for changes to policies in the policy cache 1008 and/or for newly relevant policies.

The decision data collector(s) 1012 may include one or more data collectors configured to interact with the decision data providers 512 (FIG. 5). The decision data collector(s) 1012 may collect decision data responsive to requests by the decision engine 1006, for example, requests by the decision engine 1006 for decision data that is not present in the decision data cache 1014 and/or that is out-of-date. The decision data collector(s) 1012 may furthermore maintain one or more subsets and/or types of decision data in the decision data cache 1014, for example, responsive to update notifications from the decision data providers 512 and/or with updates discovered by periodic searching.

Figure 11:
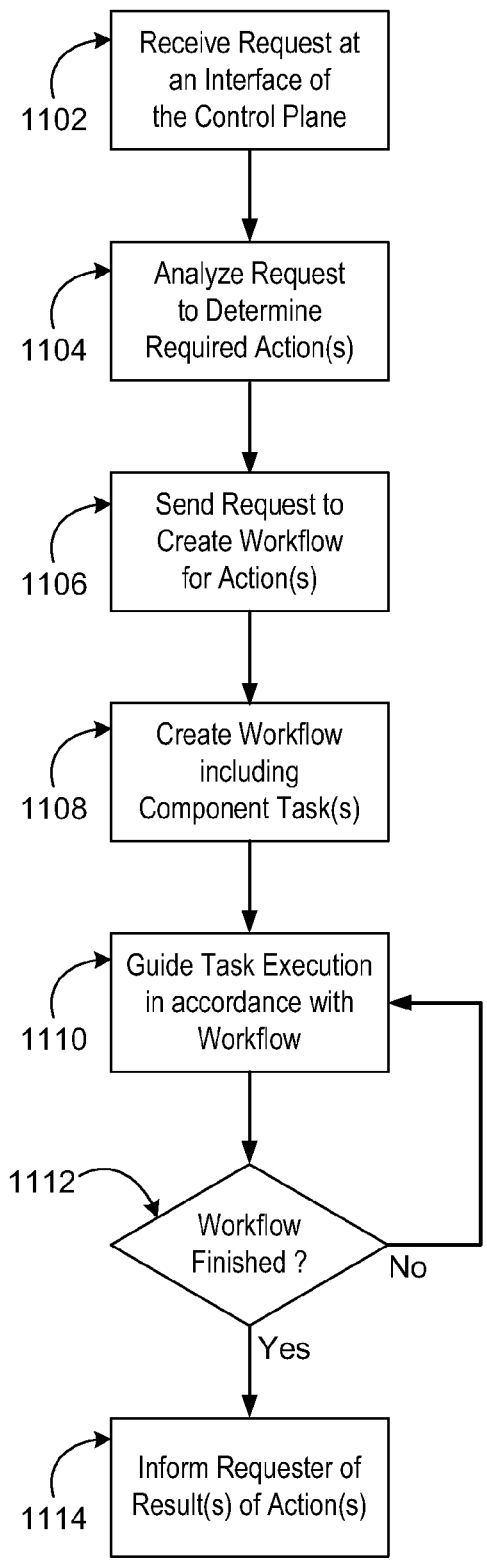
FIG. 11 is a flowchart depicting example steps for workflow management in accordance with at least one embodiment.

As described above with reference to FIG. 3, the control plane 302 may be facilitated by one or more workflows maintained by the workflow management component 322. FIG. 11 depicts example steps for workflow management in accordance with at least one embodiment. At step 1102, a request may be received by an interface of the control plane 302 (FIG. 3). For example, one of the user interfaces 304 of the control plane 302 may receive the request from a user, customer and/or administrator of the virtual resource provider 202. The request may be a call to a programmatic interface such as an application programming interface (API) or a Web services interface, e.g., utilizing a Simple Object Access Protocol (SOAP) call. Alternatively, or in addition, the request may be received through a graphical user interface (GUI) such as a Web-based GUI. At step 1104, the request may be analyzed to determine one or more actions required to successfully complete the request. For example, the provisioning interface 310 may analyze the request, and determine a set of actions required to provision a set of virtual resources 218-220 (FIG. 2). When an interface element receiving the request corresponds to a specific action to be performed, the interface may extract information from the request to be utilized in determining aspects and/or parameters of the action to be performed.

At step 1106, a request may be sent to create a workflow based at least in part on the one or more actions determined at step 1104. For example, provisioning interface 310 (FIG. 3) may send the request to the workflow management component 322. The request to create the workflow may include the action(s), action metadata such as type of action, and/or action parameters. In at least one embodiment, the control plane 302 and/or the workflow management component 322 maintains a job queue for such requests, and workflows are created responsive to new additions to the job queue. At step 1108, a workflow and one or more component tasks may be created. For example, the workflow management component 322 may analyze the request of step 1106 to determine the appropriate workflow and component tasks to create.

At step 1110, execution of the component task(s) may be guided in accordance with the workflow. For example, the workflow management component 322 (FIG. 3) may activate elements of interfaces of various implementation resources to provision the set of virtual resources. Alternatively, or in addition, the workflow management component 322 may manage bids for execution of the component task(s) by components of the virtual resource provider 202. At step 1112, it may be determined whether the workflow has finished. For example, the workflow management component 322 may determine whether a final task in a sequence of tasks managed by the workflow has completed. If so, a procedure incorporating step 1112 may progress to step 1114. Otherwise the procedure may return to step 1110 for a next task and/or task sequence. Workflows may guide multiple task sequences executing in parallel. In this case, it may be that the workflow is not finished until each of the multiple task sequences completes and/or an explicit workflow finished flag is set by one of the component tasks. At step 1114, the sender of the request of step 1102 may be informed of result(s) of the action(s).

Figure 12:
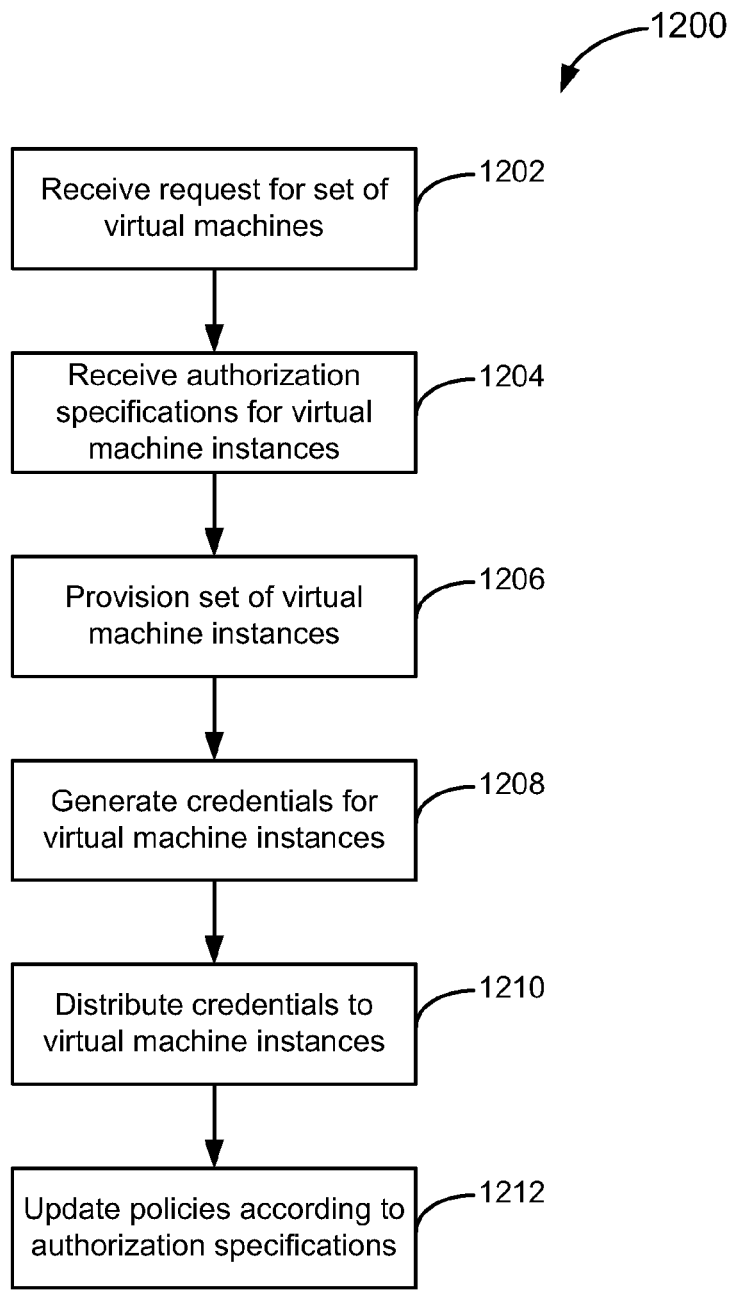
FIG. 12 is a flowchart depicting example steps for credential management in accordance with at least one embodiment.

FIG. 12 shows an illustrative example of a process 1200 which may be used to provide computing resources in accordance with an embodiment. Some or all of the process 1200 (or any other processes described herein, or variations and/or combinations thereof) may be performed under the control of one or more computer systems configured with executable instructions and may be implemented as code (e.g., executable instructions, one or more computer programs, or one or more applications) executing collectively on one or more processors, by hardware, or combinations thereof. The code may be stored on a computer-readable storage medium, for example, in the form of a computer program comprising a plurality of instructions executable by one or more processors.

In an embodiment, the process 1200 includes receiving 1202 a request for a set of virtual machine instances. The request for the set of virtual machine instances may be made, for instance, by a customer of a remote computing services provider. The request for a set of virtual machine instances may specify one or more actions to be taken in connection with the requested set of virtual machine instances, such as provisioning the virtual machine instances. Other information may also be received as part of or, generally, in connection with the request, such as one or more machine images to be used with the set of virtual machine instances and other configuration details. However, the request may be any general request that identifies a set of virtual machine instances.

In an embodiment, authorization specifications for the requested virtual machine instances are received 1204. The authorization specifications may be received separately from, or as a part of, the request for virtual machine instances. In embodiments, the authorization specifications include information specifying a policy and/or granularity information. Information specified in the policy may be in accordance with the above description, although any method of specifying actions that may or may not be taken by one or more virtual machine instances, possibly under one or more conditions, may be used. As an example, the policy may specify that all users may use the virtual machine instances to read a particular storage volume that is maintained by a block data storage service. Similarly, another policy may specify that only certain users may use the identified virtual machine instances to write to the storage volume. Generally, the policy may specify one or more actions that may be taken by one or more virtual machine instances. The actions may specify, for example, application programming interface (API) calls that may be made. The API calls may be selected from a plurality of possible calls that may be made in connection with various services provided by a remote computing services provider, or generally, any operator of computing services. As a specific example, a policy may state that any virtual machine instance having particular credentials may make certain API calls that can terminate, stop, and/or otherwise affect other virtual machine instances.

The granularity information, in an embodiment, is information which may be used to determine how credentials for the requested virtual machine instances are to be distributed. For a set of one or more virtual machine instances, in an embodiment, the granularity information is determinative of how many sets of credentials are to be generated for the set of virtual machine instances and is determinative of one or more subsets of the set of virtual machine instances to which the credentials are to be distributed. As an example, the granularity information may specify that each of the requested virtual machine instances should receive a corresponding unique set of credentials. The granularity information may also specify other levels of granularity. For instance, granularity information may specify that one or more groups of the requested virtual machine instances should receive a corresponding set of credentials, for some definition of the groups, which may be user-defined and/or selected. For instance, the granularity information may identify a plurality of subsets of the set of virtual machine instances where each subset of the set of requested virtual machine instances is to receive a separate set of credentials. The subsets may be identified based at least in part on one or more characteristics of the subsets and generally the parameters for the granularity information may include information identifying a host class, a placement group or other logical grouping of computing resources, a geographic location, one or more hardware characteristics for hardware used to provision the virtual machines, and generally any information which may differentiate virtual machine instances from one another, including, but not limited to, user-assigned tags for the virtual machine instances. Users may also define subsets by selecting virtual machine instances for each subset.

In an embodiment, the set of virtual machine instances is provisioned 1206. Provisioning may be accomplished by allocating hardware resources to the requested virtual machine instances, as described above. In addition, in an embodiment, credentials for the virtual machine instances are generated 1208 in accordance with an embodiment. The credentials may be generated according to the authorization specifications. Continuing with an example provided above, if the authorization specifications indicate that each of the virtual machine instances should have their own credentials, credentials may be generated for each of the virtual machine instances. Generally, if the authorization specifications indicate that each of a plurality of subsets of the virtual machine instances should receive their own credentials, credentials may be generated for each subset. It should be noted that, while generating credentials for the virtual machine instances is shown as a set occurring subsequent to other steps in the process 1200, credential generation may occur at other times. For instance, credentials may be pre-generated and assigned as needed. In this example, generating credentials may comprise assigning already-generated credentials as necessary, based at least in part on granularity information.

Once the credentials for the virtual machine instances are generated 1208, the generated credentials are distributed 1210 to the virtual machine instances. Distribution of the credentials for virtual machine instances may be accomplished in any suitable manner, such as by sending, over a communications network, the credentials to the virtual machine instances for use by the virtual machine instances in authenticating themselves with respect to one or more virtual resource services, such as in a manner described above. The distributed credentials may be made available to one or more processes executing on the virtual machine instances, such as by configuring a virtual machine instance that has received the credentials to be able to provide the credentials to the one or more processes and/or storing the distributed credentials in a data store accessible to the virtual machine instance. As another example, the credentials may be distributed and/or otherwise made available via an unauthenticated web server located at a well-known network location, such as a predetermined IP address for a server configured to provide credentials to virtual machine instances and/or other computing resources. Credentials may also be made available via a public-key cryptography system (PKCS) interface. In an embodiment, the public-key cryptography system interface is an interface that complies with PKCS#11 and/or other suitable standards. The distributed credentials may be maintained in a manner wherein the distributed credentials are accessible only by the virtual machine instances to which the distributed credentials were distributed, possibly subject to one or more exceptions. For example, the distributed credentials may be accessible by a computer system involved in the management and distribution. Thus, another virtual machine instance to which the credentials have not been distributed may be prevented from accessing the credentials unless another machine instance to which the credentials were distributed has provided the credentials to the other virtual machine instance and any applicable policies allow such distribution. Distribution of the generated credentials may be done in a secure manner, such as over a secure shell (SSH) connection and, generally, may be done in any suitable manner which results in credentials being usable by virtual machine instances for authentication. Distribution of credentials may also include updating one or more systems used for authentication, such as an authentication service described above, which may maintain a mapping of credentials to virtual machine instances, such as by one or more database tables. In an embodiment, one or more data structures (such as a relational database table) are used to associate, either directly or indirectly, credentials with one or more actions that may be taken by virtual machine instances (or other resources) that are able to provide the credentials, possibly subject to one or more other conditions. An authentication service may utilize the one or more data structures in one or more determinations whether to provide access to a virtual machine instance requesting the access. Upon distribution of credentials, such data structures may be updated.

In an embodiment, one or more policies applicable to the authorization specifications are updated 1212. For instance, if the authorization specification specifies that one or more subsets of the requested virtual machine instances will have certain privileges, one or more stored policies may be updated to reflect the privileges granted to the requested virtual machine instances. As noted, one or more policies may be based at least in part on credentials. As an example, a policy may permit or deny one or more actions to virtual machine instances having a particular set of credentials and/or a certain class of credentials. Accordingly, updating policies may include identifying in the policies information that allows specific credential-based conditions to be checked. Updating policies may also include, for one or more policies associated with the credentials, assigning one or more virtual machine instances to which credentials have been distributed as principals of the one or more policies. As with other steps in the process 1200 (and generally, with steps of other processes described herein), updating policies is shown in a particular place in connection with a series of steps. However, policy updates may be made at any suitable time.

Additional actions may be taken in connection with the process 1200, or variations thereof. For example, the credentials may be received from the virtual computing instances and used in an authentication process, as described below. In addition, more than one set of credentials may be provided to one or more virtual machine instances. Further, while various embodiments described herein focus on authentication in connection with services of a remote computing services provider, credentials distributed in accordance with the various embodiments may be used in other instances, such as for authentication with third parties and, generally, any process in which credentials are used.

Figure 13:
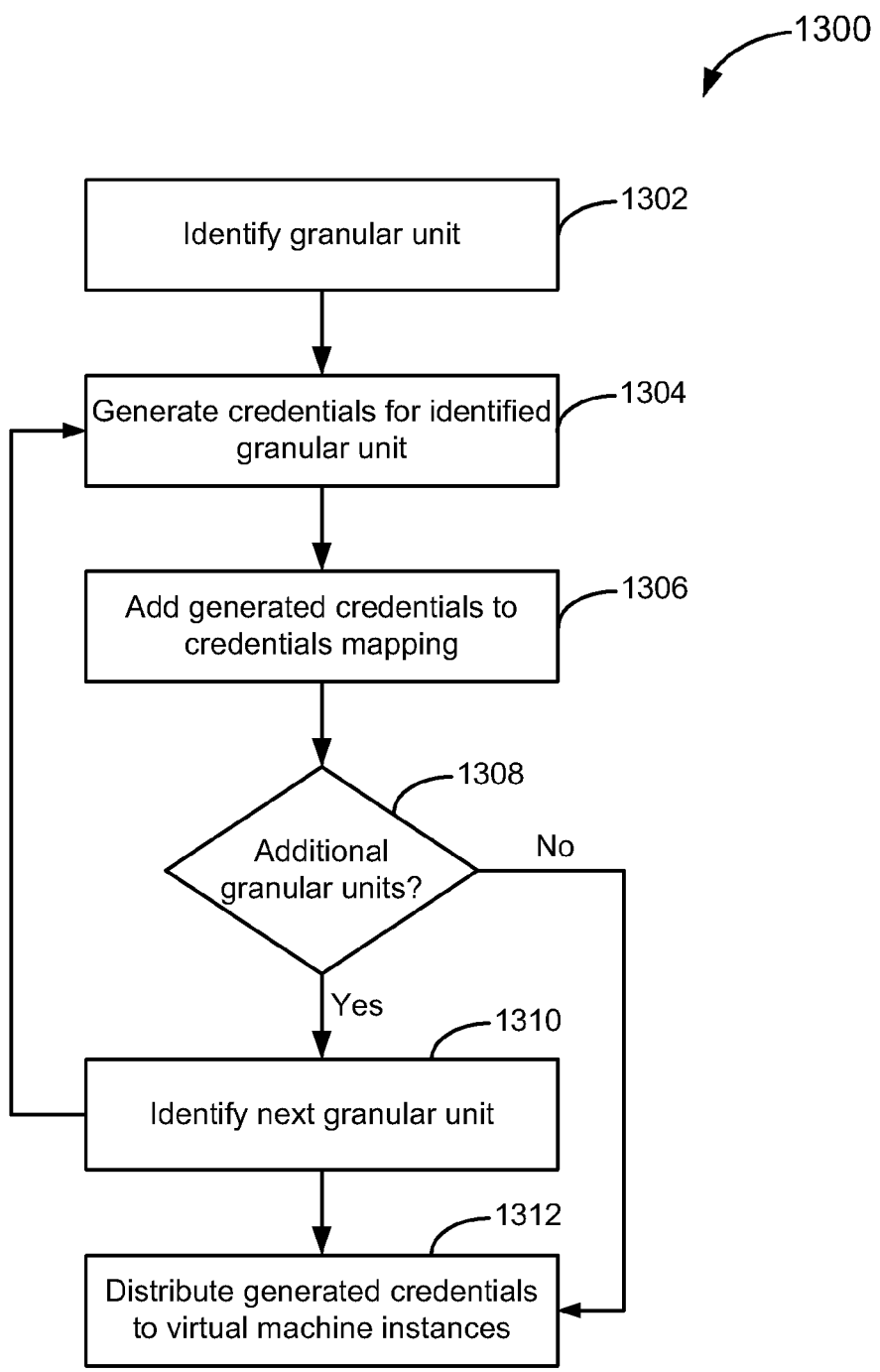
FIG. 13 is a flowchart depicting example steps for generating credentials, which may be used in connection with the process illustrated in FIG. 12, in accordance with at least one embodiment.

As noted above, credentials may be generated in accordance with information specifying a granularity for such credentials. Accordingly, FIG. 13 shows an illustrative example of the process 1300 which may be used to generate and distribute credentials according to granularity information specified by the user. In an embodiment, a granular unit is identified 1302. A granular unit may be a set of one or more virtual machine instances associated with a set of credentials used by all of the virtual machine instances in the set. The granular unit may be based in part on granularity information provided by a user in connection with the request for one or more virtual machine instances. For example, if the granularity information indicates that each virtual machine instance is to receive its own set of credentials, a granular unit may be a virtual machine instance. Granular units may also be sets of multiple virtual machine instances, such as indicated by the granularity information. A granular unit may be, for example, a set of all virtual machine instances of a customer of a remote computing services provider that are implemented using a particular class of host hardware, or a subset of such virtual machine instances. As another example, a granular unit may be a set of a customer's (or, generally, user's) virtual machine instances located in a particular data center, or having been assigned with a tag. As yet another example, a granular unit may be a set of a user's virtual machine instances having a particular property or combination of properties, or, generally, satisfying a set of one or more criteria.

In an embodiment, credentials for the identified granular unit are generated 1304 in accordance with an embodiment. Generation of the credentials may be performed in any suitable manner, which may depend on one or more protocols for which the credentials will be used. In an embodiment, credentials are generated as unique identifiers for corresponding sets of virtual machine instances. Credentials may be or include a key for an authentication algorithm, such as a key for a public-key cryptography algorithm. Thus, for an identified granular unit, the credentials are a unique identifier string to be shared by the virtual machine instances of the identified granular unit. However, the credentials may be any set of credentials that may be used with an authentication protocol. In addition, the credentials may encode at least some information representative of metadata of resources in the granular unit. For instance, if the granular unit is a virtual machine, the credentials may encode an Internet Protocol (IP) address for the virtual machine instance, and, if the identified granular unit includes a plurality of virtual machine instances, the credentials may encode a set of IP addresses for the virtual machine instances of the identified granular unit. Generally, the credentials may encode any information about any virtual machine instances associated with the credentials. In an embodiment, credentials encode one or more policies. For instance, if a virtual machine instance is implemented on a host machine, credentials accessible by the virtual machine may encode a token that may be required to be used with a key provided by the host machine in an authentication procedure. In this manner, the credentials encode a policy that requires use of the credentials to be limited to virtual machines implemented by the host. Such credentials may be provided to multiple virtual machines on the same host. Thus, if another virtual machine provides the credentials from another host that does not have the corresponding key, authentication may fail. In addition to the above, as noted, credentials, or portions thereof, may be pre-generated and assigned as needed instead of generated upon identification of a granular unit as illustrated in FIG. 13.

In an embodiment, the generated credentials are added 1306 to a credentials mapping. As discussed, the mapping may associate credentials of virtual machine instances with the instances themselves. For instance, the mapping may associate credentials to a set of IP addresses and/or other identifiers of virtual machine instances. As noted above, the mapping may be maintained by an authentication service. For a virtual machine, the mapping may be used, in accordance with the above description, to verify, for instance, that a request made by a virtual machine using the credentials is associated with the credentials, to ensure that a virtual machine has the proper privileges to perform any actions requested by the virtual machine, and/or to allow the virtual machine to establish a connection (such as an SSH, HTTP, or other connection) with another system, such as a system providing a virtual resource service, as described above.

In an embodiment, a determination is made 1308 whether there are additional granular units for which credentials could be generated. If, for example, credentials have not been generated to all granular units specified by authentication information specified by a customer, the determination may be that there are additional granular units. In an embodiment, if the determination is that there are additional granular units for which credentials should be generated, the next granular unit is identified 1310 in accordance with an embodiment. The next granular unit may be the same type as the previously-identified granular unit, although it may be of a different type. For instance, if the previously-identified granular unit was a set of one or more virtual machines, another identified granular unit may have more or less members of a set of one or more virtual machines. With the next granular unit identified 1310, credentials for the identified granular unit are generated 1304, such as in a manner described above. If, however, it is determined that there are no additional granular units, then the generated credentials are distributed 1312 to the computing resources of the granular unit or units for which credentials were generated. As an example, if credentials were generated for each of a plurality of virtual machine instances, the generated credentials would be distributed to each of the virtual machine instances. Similarly, if credentials were generated for a granular unit having multiple virtual machine instances, the credentials generated for the granular unit may be distributed to the virtual machines of the granular unit. In this last example, each virtual machine instance in the granular unit may receive the same credentials (such as the same unique identifier), while virtual machines may receive other credentials.

Figure 14:
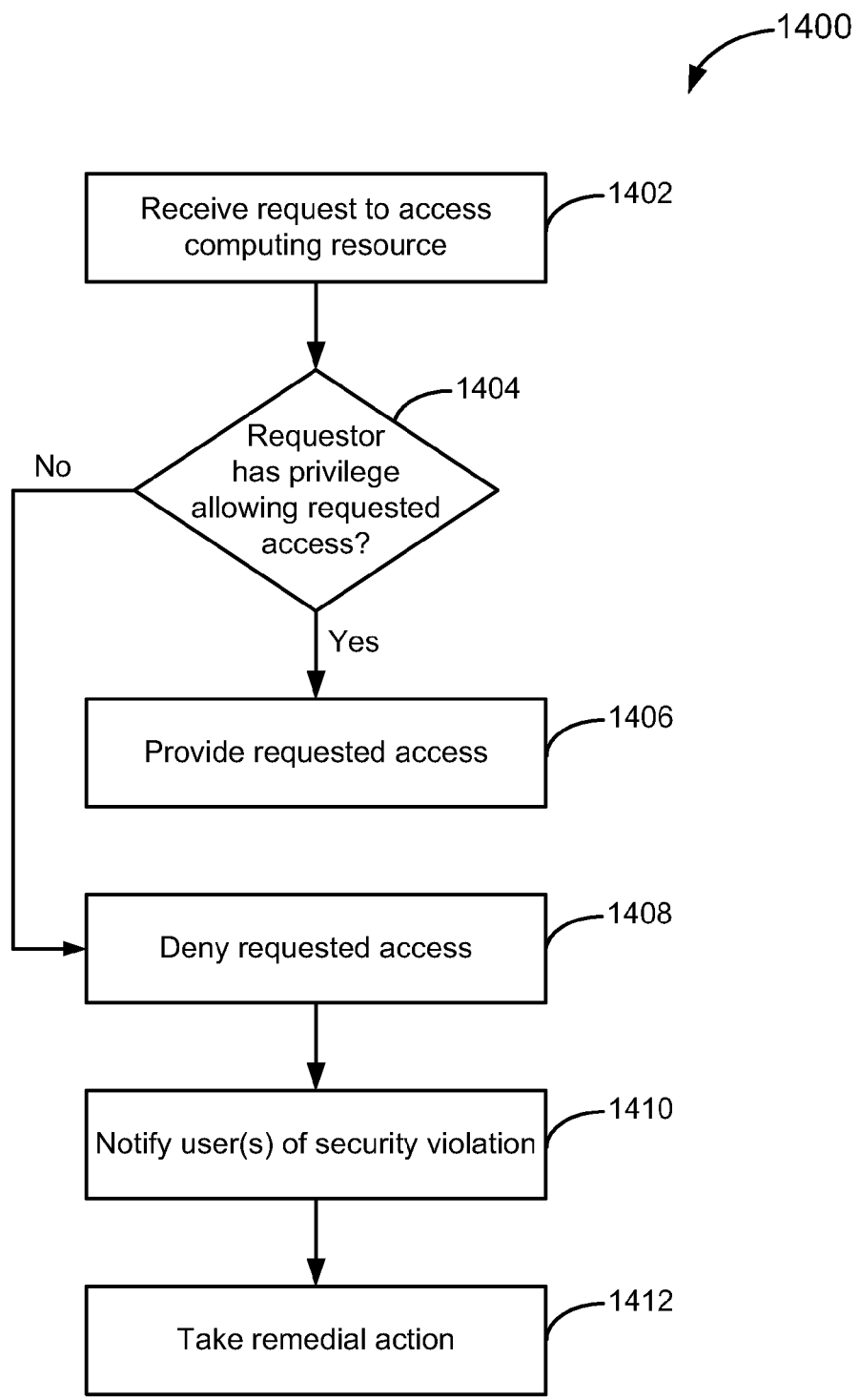
FIG. 14 is a flowchart depicting example steps for using credentials in accordance with at least one embodiment.

As discussed, credentials distributed to virtual machine instances in accordance with various embodiments described herein can be used in various ways. FIG. 14 shows an illustrative example of one such process 1400 which shows how credentials generated in accordance with the various embodiments may be used. In an embodiment, the process 1400 includes receiving 1402 credentials in connection with a request to access a computing resource. A request to access a computing resource may be received, such as in the manner described above. For instance, a resource interface of a virtual resource service may receive a request generated from another virtual resource service that operates virtual machine instances on behalf of one or more customers and/or other users. As a concrete example, a resource service for virtual machine instances may send a request originating from one of the virtual machine instances to a block storage or other storage resource. In an embodiment, the request includes the credentials from a virtual machine instance that made the request, although the credentials may be provided separately from the request, such as before the request, or after a subsequent authentication request for credentials from the receiver of the request. Generally, the credentials may be received in any suitable manner, and the manner by which credentials are received may vary according to various protocols being used in accordance with the various embodiments.

When the credentials in connection with the request to access the computing resource are received 1402, in an embodiment, a determination is made 1404 whether the requester has a privilege allowing the requested access. Determination may be made, for instance, by a policy enforcement component of a virtual resource service such as in the manner described above in connection with FIG. 8. The policy enforcement component may utilize an authentication service to authenticate the credentials and, if successfully authenticated, establish a connection with the virtual machine instance that provided the credentials, at least for a period of time. In some embodiments, however, the receiver of the credentials may authenticate a virtual machine supplying the credentials itself instead of using a separate authentication service. Generally, any process for determining whether the credentials received are valid may be used.

If it is determined that the requester has a privilege allowing the requested access, the requested access may be provided 1406. Providing the requested access may be performed in any suitable manner. In an embodiment, providing the requested access includes establishing an SSH or other connection with a computing device of a resource, such as a server operating in connection with a virtual computing resource. As another example, the virtual machine instance requesting the access may be provided read, write, and/or other access to a data store of a data storage service. As another example, a virtual machine instance running one or more applications (such as Red Hat Enterprise Linux (RHEL)) may be provided access to an update service for the one or more applications, such as an RHEL update repository. In this manner, the virtual machine instance can use its credentials to update applications running on the virtual machine instance. It should be noted that, credentials may be used in different ways in different circumstances. For instance, credentials at some times may be used to establish a connection with another computing device while at other times credentials may be used to simply cause performance of one or more operations at another computing resource.

If it is determined that the requester does not have a privilege allowing the requested access, then the requested access is denied 1408. As illustrated in FIG. 14, although not necessary, one or more other actions may be completed in addition to denying the requested access. For instance, as illustrated, one or more users are notified 1410 of a security violation. Users may receive, for example, an electronic message specifying that a security violation has occurred, and including details of the security violation. In addition, as an example, remedial action may be taken 1412 in accordance with an embodiment. As an example, if the request to access a computing resource included a set of credentials and those credentials were used to make the determination that the requestor did not have a privilege allowing the requested access, the credentials may be permanently or temporarily invalidated so that the credentials are not used in attempts to access other computing resources. Generally, any remedial action may be taken. Further, as with other processes described herein, the process 1400 is shown in a simplified manner and variations are contemplated as being within the scope of the present disclosure. For instance, any remedial action taken may be based at least in part on additional information, such as a number of failed authentication attempts, the type of access requested, information encoded in the request, such as an IP address or other information, and the like.

Figure 15:
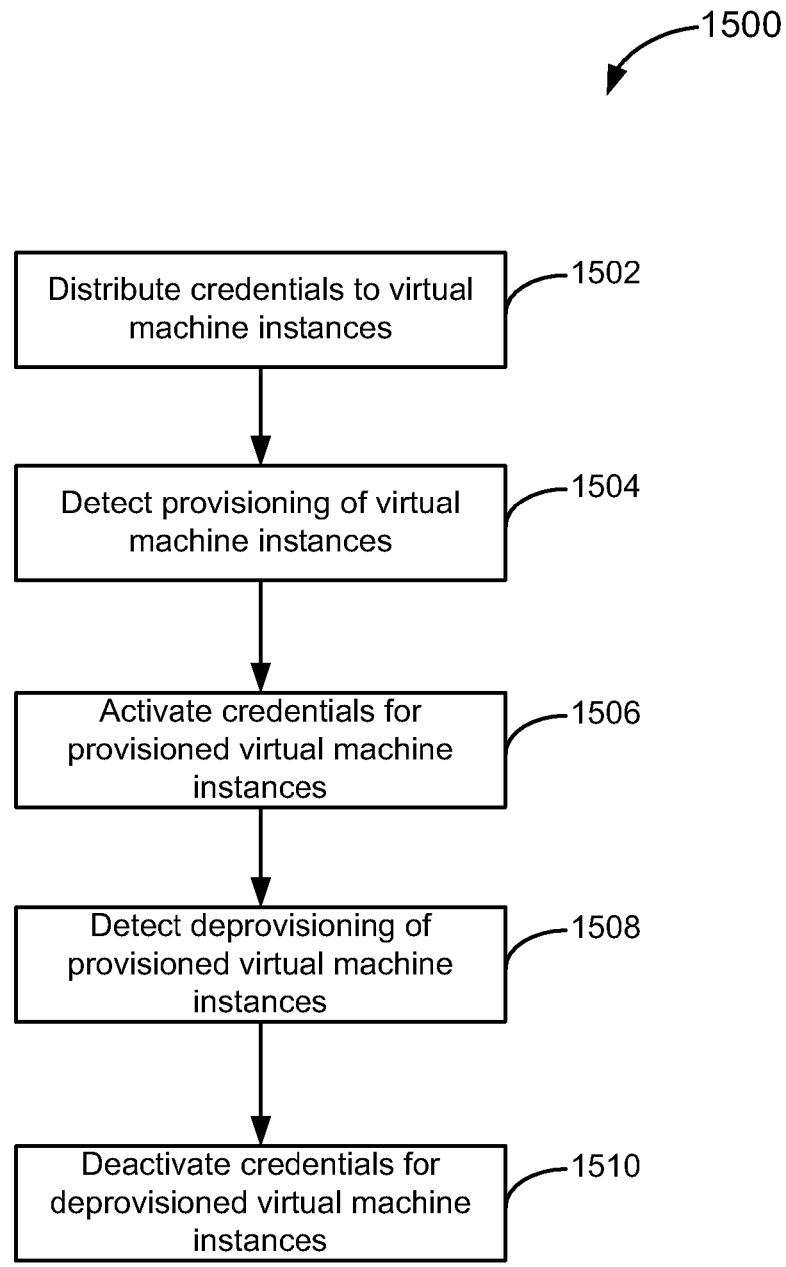
FIG. 15 is a flowchart depicting example steps for managing credential states in accordance with at least one embodiment.

In some instances, it may be desirable to manage the validity of credentials in order to increase security. For instance, in an embodiment, if credentials belong to a single virtual machine instance, and the virtual machine instance currently is not provisioned, but stored in a data store for potential future use, the virtual machine may be unable to use the credentials. Thus, it may be desirable to prevent the credentials from being used when no virtual machine is able to use the credentials to authenticate itself, either because of a state of one or more virtual machines having the credentials and/or because of one or more policies. Accordingly, FIG. 15 shows an illustrative example of a process 1500 for managing credentials, in accordance with an embodiment. In this illustrative example, the process 1500 includes distributing credentials to one or more virtual machine instances. Distribution of the credentials may be performed in any suitable manner such as those described above.

In an embodiment, provisioning of virtual machine instances is detected 1504. Detection of provisioning of the computing resources may be performed in any suitable manner. In an embodiment, provisioning a virtual machine instance is accomplished according to a workflow that includes sending a message that the virtual machine instance has been successfully provisioned. Accordingly, detecting the provisioning of virtual machine instances may be performed by receiving one or more such messages. It should be noted that, while detecting provisioning of virtual machine instances is used to illustrate an embodiment of the present disclosure, other actions may be taken in place of detection of provisioning the virtual machine instances, such as receiving a request to provision the virtual machine instances, or, generally, receiving any signal indicative of a part of a provisioning process.

In an embodiment, when the provisioning of the virtual machine instances is detected 1504 (or, generally, when an event in connection with the provisioning of the virtual machine instances is detected), the credentials are activated for the virtual machine instances. Activating the credentials may be performed, for instance, by updating a credentials mapping of credentials to virtual machine instances to reflect the credentials being active. Such may be accomplished by adding the credentials into the mapping, by tagging the credentials in a mapping as active, or, generally, in any suitable manner. As a concrete example, a database table or other mechanism of an authentication service that associates credentials with virtual machine instances may be updated to reflect whether the credentials are currently active by adding an appropriate number of rows into the table or setting a value for the credentials to indicate that the credentials are active. If credentials are active, then virtual machine instances having the credentials may use the credentials for authentication. If the credentials are inactive, then any device attempting to use the credentials for authentication should be unable to authenticate. Generally activating the credentials for the provision of computing resources can be done in any manner that allows the provisioned computing resources to utilize the credentials for authentication with one or more other virtual resource services. For instance, if a virtual machine wants to access a data store of a storage service, the virtual machine may use the credentials to authenticate itself with the storage service because the credentials are active. The credentials may remain active as long as the computing resources remain provisioned.

In an embodiment, deprovisioning of one or more of the provisioned virtual machine instances s detected 1508. While deprovisioning is used for the purpose of illustration, any suitable action may be detected, including, but not limited to, actions related to, but not necessarily equivalent to the deprovisioning of provisioned virtual machine instances. An example includes receiving a command to deprovision one or more of the provisioned virtual machine instances. Returning to the illustrated example, detection of deprovisioning of the one or more provisioned virtual machine instances may be made when hardware for a virtual machine instance is deallocated from the virtual machine instance and a memory state of the virtual machine instance is stored for future use.

In an embodiment, upon detection of the deprovisioning of one or more of the deprovisioned virtual machine instances, the credentials for the deprovisioned virtual machine instances are deactivated 1510 in order to ensure that credentials cannot be used by any other computing resources. In this manner, if a security breach occurs with respect to a deprovisioned virtual machine, the credentials cannot be used to gain unauthorized access to one or more computing resources. For example, if all of the virtual machine instances sharing the same credentials are deprovisioned, then the credentials would not be active for any virtual machine and, therefore, cannot be used for unauthorized authentication. Similarly, in embodiments where virtual machines authenticate themselves using the credentials and information about themselves (such as an IP address) for authentication, authentication using the credentials may be impossible or, at least, more difficult. In one embodiment, if less than all of the provisioned virtual machine instances sharing the same credentials are deprovisioned, the credentials may be deactivated only for the deprovisioned virtual machine instances, while the remaining provisioned virtual machine instances may continue to use the credentials.

Figure 16:
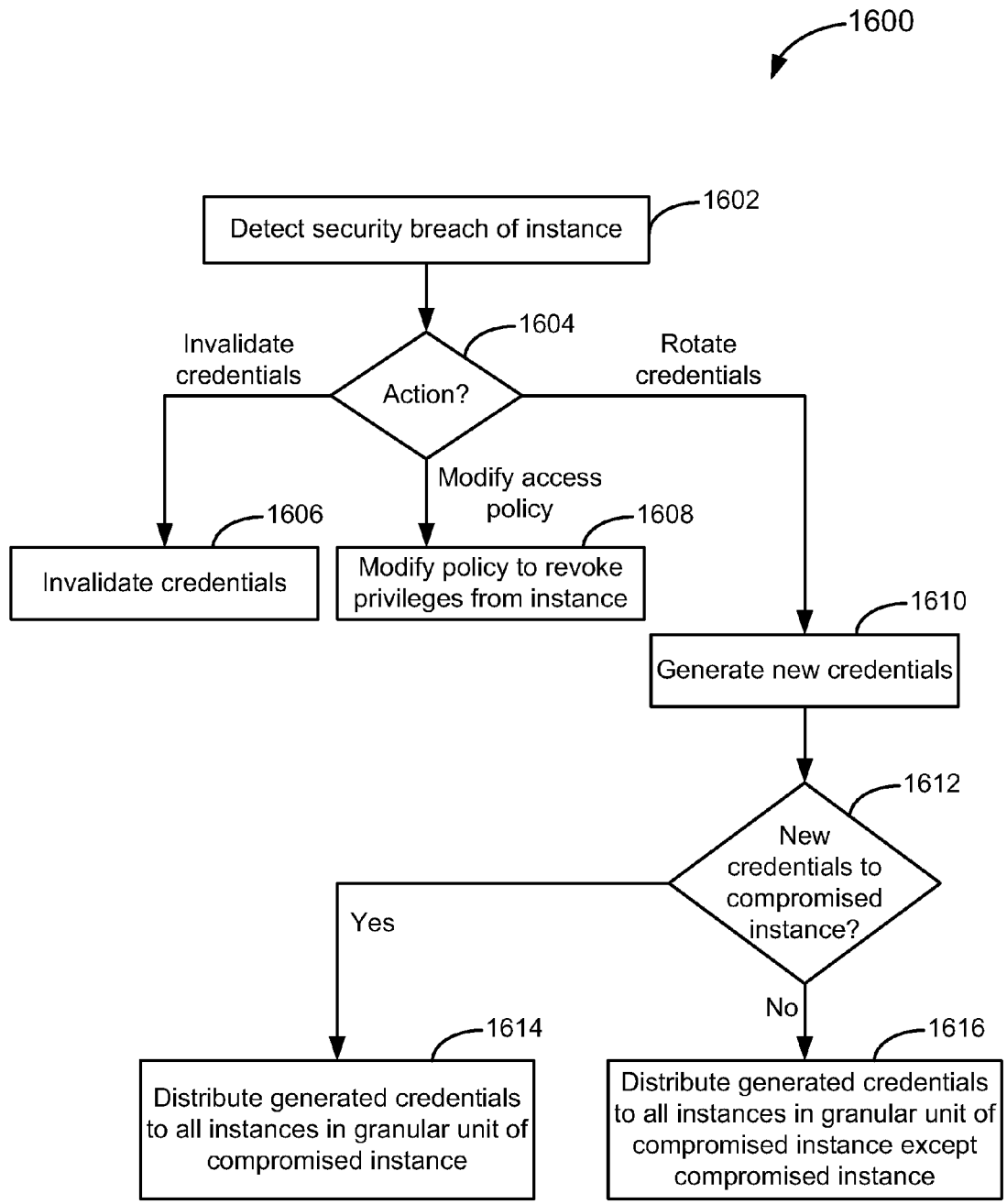
FIG. 16 is a flowchart depicting example steps for taking remedial action in connection with a security breach in accordance with at least one embodiment.

In some instances, it may be desirable to take different actions with respect to credentials when different events occur. For instance, in some instances it may be desirable to invalidate credentials upon detection of a security breach while in other instances it may be desirable to keep credentials valid while taking other remedial action. Accordingly, FIG. 16 illustrates an illustrative example of a process 1600 for managing credentials in accordance with an embodiment. In an embodiment, a security breach of a virtual machine instance is detected 1602. A detection of a security breach may be done in any suitable manner or combination thereof. For instance, detection of the security breach may be made upon a determination that credentials used in a request to access a computing resource were unsuccessfully used. As another example, the security breach may be detected based at least in part on access to a virtual machine instance by an unauthorized user. Other ways of detecting the security breach may be used as well, including, but not limited to, manual detection, detection of abnormal operation and/or other automatic methods, and/or generally any suitable method.

In an embodiment, a determination is made 1604 which action to take upon detection of the security breach. The determination may be based, at least in part, on one or more parameters such as a type of breach that is detected. While, for the purpose of illustration, three different actions are shown, there may be greater than or fewer than three actions, and the actions may be different than those illustrated. In an embodiment, upon detection of the security breach, one of several actions are selected. The selection may be made from actions such as invalidating the credentials used when the security breach was detected, modifying an access policy associated with a virtual machine instance involved with the security breach, or rotating credentials involved with the security breach. If the determination is made 1604 to invalidate the credentials, then the credentials are invalidated 1606. For instance, credentials may be deleted from a mapping that associates credentials with virtual machine instances, may be marked as inactive, or otherwise invalidated. In an embodiment, if the determination is to modify an access policy, then the policy is modified 1608 in order to revoke privileges from the instance involved in the security breach. Using the illustrated policies described above as an example, a condition(s) component of a policy may be modified to revoke one or more privileges from one or more virtual machine instances. An action(s) component or other applicable component of a policy may also be updated. Generally, the policy may be updated in any suitable manner.

If the determination is to rotate the credentials, then new credentials are generated 1610 in accordance with an embodiment, although, as discussed, credentials may have been pre-generated and stored for use when needed. In an embodiment, when new credentials are generated, a determination is made 1612 whether to distribute the new generated credentials to the compromised instance. The determination may be made based at least in part on the type of security breach that was detected. For instance, if it would present an undue risk to provide new credentials to a compromised virtual machine instance, the determination may be to not distribute the new generated credentials to the compromised instance. An example of such an undue risk includes an instance that was compromised virtual machine instance in such a way that one or more unauthorized applications have been loaded on the compromised instance. If it would not create an undue risk to provide new credentials to the compromised virtual machine instance, then the determination may be to provide new generated credentials to the compromised virtual machine instance. If it is determined to distribute the new credentials to the compromised instance, then the generated credentials are distributed 1604 to all instances in a granular unit of the compromised instance. For instance, the new credentials may be provided to all virtual computing instances that shared the credentials involved in the detected security breach.

If, however, a determination is not to distribute the new credentials to the compromised instance, then the credentials are distributed 1606 to all instances in a granular unit of the compromised instance except for the compromised instance. For example, the new credentials may be provided to all virtual machine instances sharing the credentials involved in the detected in the security breach, except for the compromised virtual machine instance. If the granular unit only contains the compromised instance, then the generated credentials may not be distributed at all and, in some embodiments, may not have been generated.

While not illustrated in the figure, the generation and distribution of new credentials may also include invalidation of previous credentials, as described above. In addition, as mentioned, other variations are also contemplated as being within the spirit of the present disclosure. For instance, actions different from those discussed above may be taken in response to detection of a security breach. In addition, combinations of actions may be taken in response to detection of a security breach. For instance, credentials may be rotated, one or more policies may be modified, and credentials involved in the security breach may be invalidated all in response to the security breach being detected.

Figure 17:
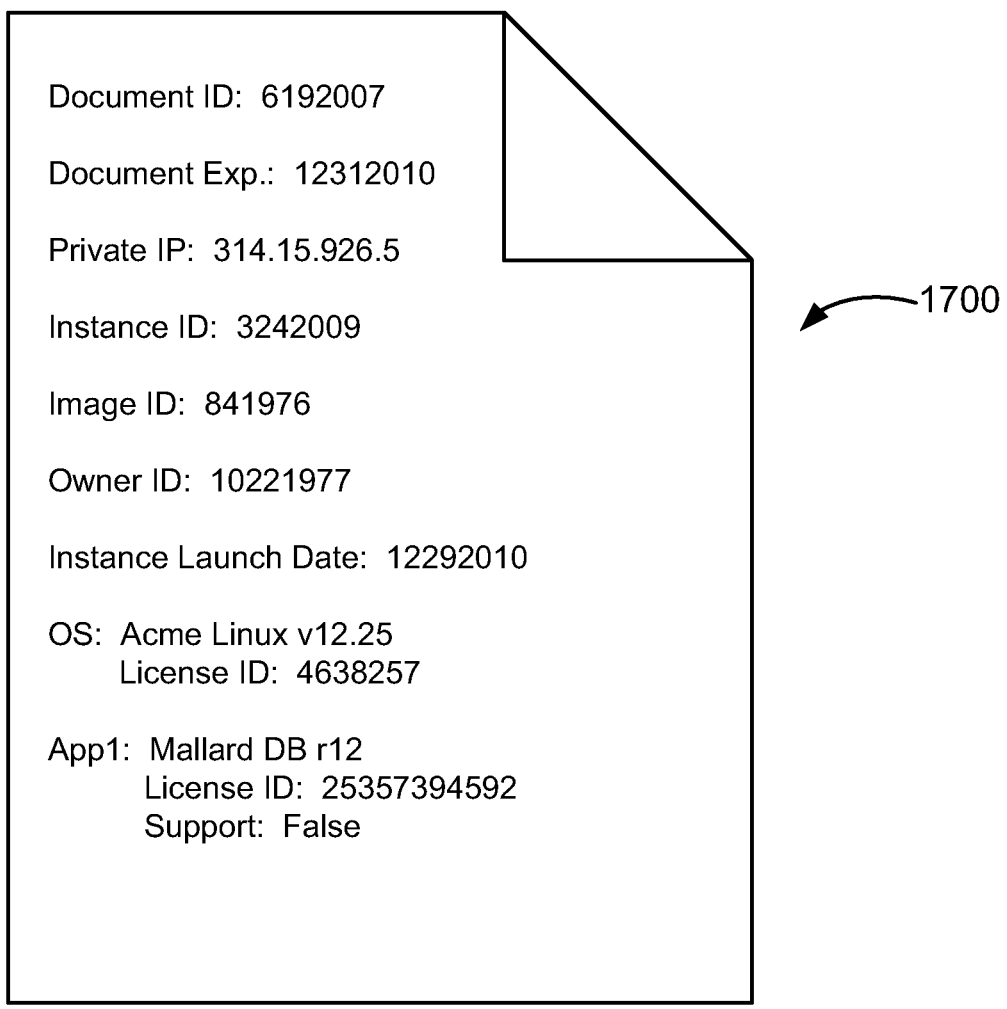
FIG. 17 is a representation of an illustrative example of an instance identity document, in accordance with at least one embodiment.

As noted above, credentials and other information may be provided in various ways. In one embodiment, information used in an authentication process or, generally, any process in which information about a computing resource is verified, may be provided in an instance identity document, an illustrative example of which is shown in FIG. 17. An instance identity document, in an embodiment, is an electronic file or other collection of information that contains information about one or more properties of, or related to, a virtual machine instance or other computing resource. It should be known that, for the purpose of illustration, examples of instance identity documents and their use in connection with virtual machine instances are used throughout this disclosure. However, instance identity documents may be used in similar manners in connection with other computing resources. Generally, instance identity documents may be used to attest to properties of any computing resource.

In the present example, an instance identity document, in an embodiment, contains information about properties of a virtual machine instance and related properties. Example information that may be included in an instance identity document is provided in FIG. 17. In an embodiment, the instance identity document includes information about the document itself. For instance, the instance identity document 1700 in this example includes a document identifier (Document ID), which, in an embodiment, is a unique identifier for the instance identity document. A computing system may associate the document identifier with the virtual machine instance to which the document corresponds. The association may be used, for instance, as discussed below, to verify information related to the instance identity document. It should be noted that the document identifier may not be included in an instance identity document as other information, such as information discussed below may be used to associate the document with a virtual machine instance. In an embodiment, the instance identity document includes an expiration value (Document Exp.) which may identify a time after which the instance identity document is not considered to be valid.

As shown in FIG. 17, the instance identity document 1700 includes various information about the virtual machine instance to which the document corresponds, such as a private IP address (Private IP), which may correspond to a private IP address assigned to the virtual machine instance. An identifier of the virtual machine instance (Instance ID) may also be provided in the instance identity document 1700. The identifier may be, for example, a unique identifier of the virtual machine instance used by a computing services provider, or information corresponding to such an identifier. The instance identity document may also include an identifier (Image ID) of a machine image (virtual appliance) used to instantiate the corresponding virtual machine instance. Similarly, the instance identity document may include a value identifying an owner of the virtual machine instance (Owner ID). The owner may be, as an example, a customer of a computing services provider that operates hardware for executing the virtual machine instance on behalf of the customer. In this example, the owner identifier may be a unique identifier used by the computing services provider to identify the owner, or information corresponding to such an identifier. The owner identifier (or another value) may also be an identifier used by another entity, such as an entity that receives the instance identity document to verify one or more properties about the virtual machine instance.

Also shown in the illustrative example of FIG. 17, the instance identity document also includes an instance launch date which identifies the date on which the virtual machine instance corresponding to the instance identity document 1700 was created. Other information on the instance identity document includes, in this example, information about operating systems and other applications utilized by the virtual machine instance which may identify software versions, identifiers of software licenses, version numbers and other attributes about software used by the virtual machine instance. For example, if a virtual machine instance utilizes a particular operating system in order to execute one or more applications, detailed information about the operating system and/or applications may be provided in the instance identity document. Information about various levels of support for one or more applications may also be included in the instance identity document 1700. As will be discussed in more detail, an entity that has received the instance identity document 1700 may verify, for instance, that the virtual machine instance has a properly licensed operating system and/or other application. Geographic information relating to a data center in which the virtual machine instance is provisioned may also be included in an instance identity document.

It should be understood that the example information provided in FIG. 17 is for the purpose of illustration and less or more information may be included with an instance identity document. Further values for various fields may be of data types different from those illustrated and, generally, may differ from that which is shown for the purpose of illustration. In addition, an instance identity document may also contain custom fields for information, and may include information that is specified by the owner of the virtual machine instance, a user associated with the owner, or anyone authorized to supply such information. For example, the owner of the virtual machine instance to which the instance identity document 1700 corresponds may include information such as whether the virtual machine instance is the customer's primary database instance and/or other information that the owner or another interested entity may find useful. Credentials, such as credentials discussed above, are another example of information that may be included in an instance identity document. For instance, credentials for use in any of the embodiments described herein may be made available to a virtual machine instance via an instance identity document. The virtual machine instance may obtain the credentials from the document and provide the credentials as needed and/or may provide the document itself in order to provide credentials.

FIG. 17 shows information of the instance identity document 1700 organized in an illustrative format that does not include various organizational and other syntactic elements. However, in an embodiment, information in an instance identity document is encoded, using a machine-readable and human-readable format such as JavaScript Object Notation (JSON), Extensible Markup Language (XML), the "YAML Ain't Markup Language" (YAML) format, or generally computer-readable and human-readable format. A human-readable format is a format in which information is organized in a manner such that meaning of the information is readily understandable by a person of ordinary skill in the art with, at most, minimal assistance from a computer or other device. For example, a human-readable format may encode information using terms and values that have meaning that is ascertainable by a human, such as one with ordinary skill in the art, without the use of automated processing. However, instance identity documents may encode some or all information in other ways which are not necessarily human-readable. For instance, an instance identity document may encode some or all information in a manner such that a person reading the instance identity document would not be able to ascertain meaning from the information without the aid of computer.

The following shows possible encoding of information of an instance identity document in JSON format:

{
"version": "2010-08-31",
"instanceId": "i-5920bd33",
"imageId": "ami-4b4ba522",
"kernelId": "aki-0b4aa462",
"ramdiskId": null,
"privateIP": "10.195.170.47",
"PaymentServiceProducts": null,
"billingProducts": ["bp-6fa54006"], "pendingTime": "2010-08-26T12:58.264Z"
}

In this example, the value for "version" may refer to a version of the document and may have a value of a date on which the document was created. The value for "kernelId" may be an identifier of a kernel of a corresponding virtual machine instance. The value for "privateIP" may be a private IP address of the virtual machine instance. The values for "PaymentServiceProducts" and "billingProducts" may specify whether corresponding services of a computing services provider providing hardware for the virtual machine instance are used by the virtual machine instance and, if so, an identifier associated with the virtual machine instance. The value for "pendingTime" may indicate an amount of time since the virtual machine instance has been provisioned. It should be understood that, as with FIG. 17, the values provided herein are for the purpose of illustration and other values and sets of values may be used.

As discussed, instance identity documents may be used to attest to various properties of a virtual machine instance or other computing resource. The instance identity document may be used, for example, to attest to one or more properties of a virtual machine instance that are necessary before one or more actions dependant on the existence of those properties are taken.

Figure 18:
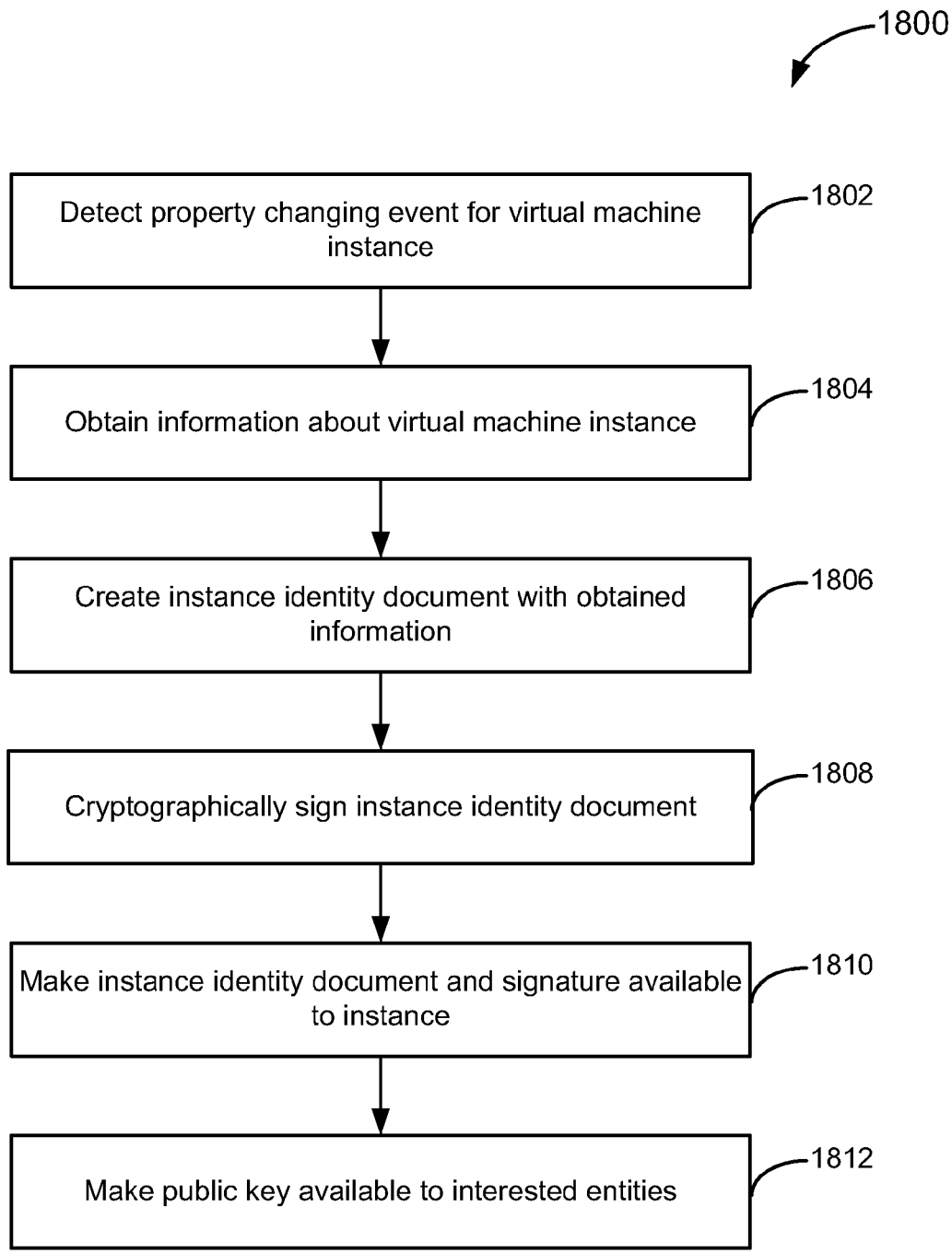
FIG. 18 is a flowchart depicting example steps for making an instance identity document available, in accordance with at least one embodiment.

FIG. 18, accordingly, provides an illustrative example of a process 1800 for utilizing an instance identity document in accordance with an embodiment. In an embodiment, a property-changing event for a virtual machine instance is detected 1802. The property-changing event may be related to provisioning and/or deprovisioning of the virtual machine instance. However, the other property-changing events may also be detected. Generally, any event by which a property of a virtual machine instance may change may be detected. Examples of properties that may change and, therefore, trigger detection of a property-changing event, are provided above in FIG. 17. For instance, if one or more software applications are installed on the virtual machine instance, installation may be detected. Application upgrades and/or support agreements may also be detected. Another event that may be detected includes an event in connection with a user specifying one or more properties of a virtual machine instance for use in an instance identity document. For instance, the owner of a virtual machine instance may wish to include one or more custom properties in an instance identity document for various reasons (such as to attest to the custom properties to a third party), and the user supplying the one or more properties may be detected. Generally, any event in connection with a property change of a virtual machine instance may be detected.

Returning to the example of FIG. 18, in an embodiment, information about the virtual machine instance is obtained 1804. For instance, a control plane environment used to monitor and/or control various aspects of one or more computing resources, as described above, may provide information about the virtual machine instance such as some or all of the information discussed above in connection with FIG. 17. A metadata service of the control plane, for example, may store such information and provide the information when the information is needed by a computing resource. In an embodiment, once information about the virtual machine instance is obtained 1804, an instance identity document is created 1806 with the obtained information. Creating the instance identity document may, for instance, be accomplished by encoding the obtained information in a machine-readable and human-readable format, such as JSON, in an electronic file.

Once the instance identity document has been created 1806, in an embodiment, the created instance identity document is cryptographically signed 1808. Cryptographically signing the instance identity document may be accomplished in any suitable manner. For example, one of various digital signature schemes may be used to electronically sign the instance identity document. Example digital signature standards include the digital signature standard (DSS), the El Gamal signature scheme, and the Rivest, Shamir, and Adleman (RSA) digital signature scheme. In an embodiment, the signature is a Base64 encoded raw signature generated according to the PKCS#1 standard, using the 256-bit Secure Hash Algorithm (SHA) hash function, SHA-256, with RSA encryption. Generally, the document may be electronically signed using any suitable method which allows for the verification that allows a computing device that has received the instance identity document to verify that the contents of the instance identity document have not been answered. Public-key, private-key, or other digital signature schemes may be used. In an embodiment, a public key digital signature scheme is utilized to sign the instance identity document. A device in a control plane signs the document using a private key that is generally not available outside of the control plane by using the private key to generate a signature.

In an embodiment, once the instance identity document has been cryptographically signed 1808, in an embodiment, the instance identity document and a signature of the instance identity document are made available 1810 to the virtual machine instance. In an embodiment, the document signature is part of the instance identity document. For example, the document may be the signature of some canonicalized subset of the complete instance identity document. The signature of the instance identity document may also be provided as a detached signature that is provided as or in a separate file. In one embodiment, the instance identity document and signature are provided to the virtual machine instance and the virtual machine instance may then, on its own, provide the instance identity document and signature as needed. The instance identity document and signature may be made available in other ways. For instance, in another embodiment, the instance identity document is not provided to the virtual machine instance, but the instance identity document is maintained by another computing device. For example, an instance identity document and its signature may be maintained using a metadata service of a computing services provider. The metadata service may be accessed in order to obtain the instance identity document and its signature using a web service protocol. In this example, the virtual machine instance may, when necessary, instruct the other computing device to provide the instance identity document and signature when needed. In an embodiment, the instance identity document is made available only to a corresponding virtual machine instance. Thus, in this embodiment, a user may not obtain an instance identity document corresponding to a virtual machine instance without instructing the virtual machine instance to obtain the instance identity document. Generally, any suitable manner of making the instance identity document and signature available to the virtual machine instance may be used.

As noted, in an embodiment, a public key cryptographic digital signature scheme is utilized in order to sign the instance identity document. In such an example, in an embodiment, a public key corresponding to the private key used to generate the signature of the document is made available 1812 to interested entities. The public key may be encoded in a certificate, such as a an X.509 format certificate, that is distributed to one or more interested entities. As noted, an interested entity may be, for example, an owner of a cloud software repository or generally any entity which may utilize the instance identity document for any suitable reason. In this manner, as will be discussed in more detail below, the interested entities may use the public key that has been made available to verify the validity of the instance identity document when provided to them.

Figure 19:
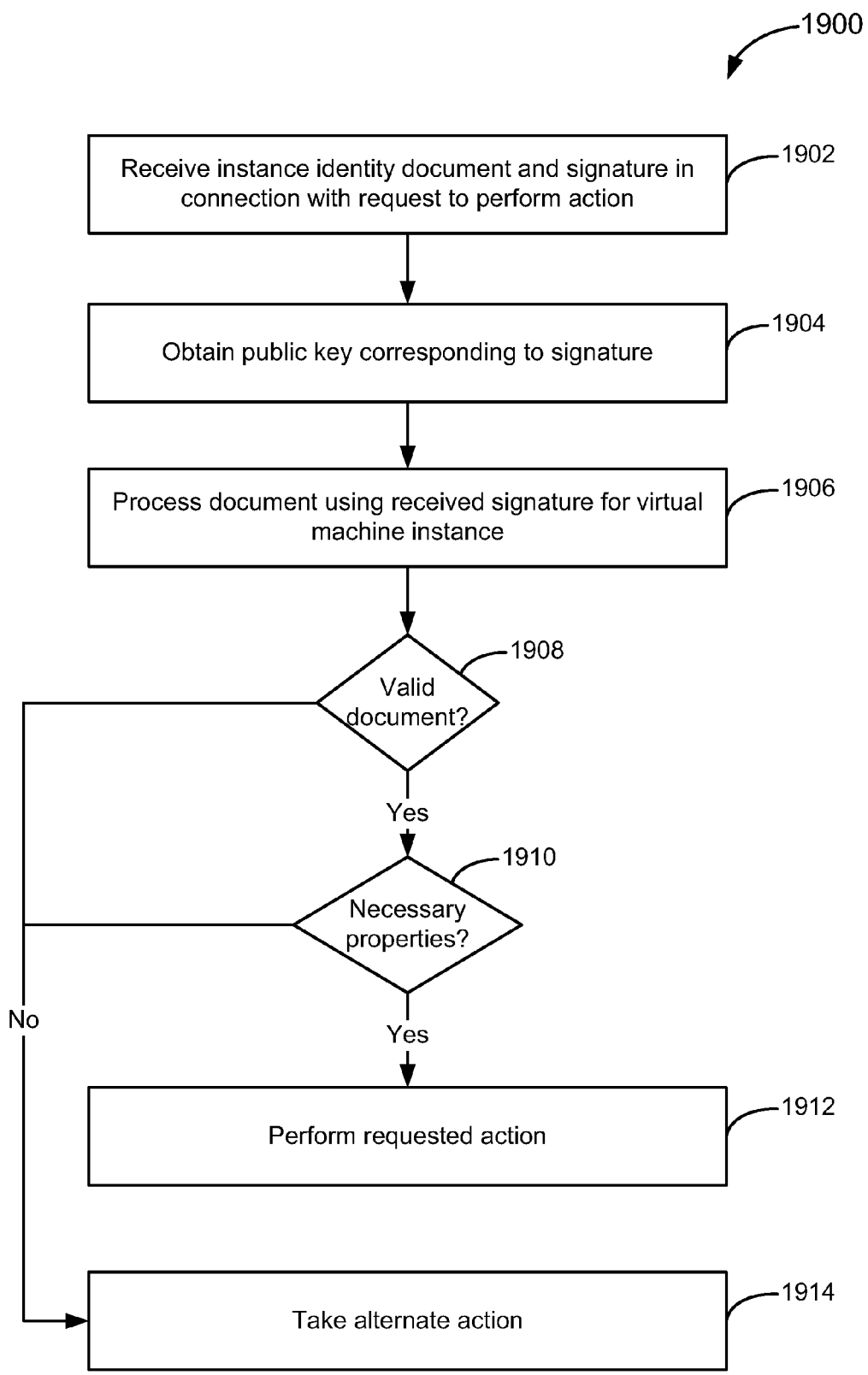
FIG. 19 is a flowchart depicting example steps for using an instance identity document to verify that a computing resource has one or more properties, in accordance with at least one embodiment.

Accordingly, FIG. 19 provides an illustrative example of a process 1900 for utilizing an instance identity document. In the illustrative example of FIG. 19, an instance identity document and signature of the instance identity document in connection with a request to perform an action and signature are received 1902. An interested entity may, for example, have received the instance identity document from a virtual machine instance in connection with a request to perform an action, such as providing an application update. In addition, in an embodiment, a public key corresponding to the signature of the instance identity document is obtained 1904. As an example, the public key may have been published by a computing device that generated the signature or a related device. The public key may be available from the entity that generated the signature or another entity. In an embodiment, a control plane environment includes a public key server that is operable to receive requests for public keys and respond to the requests by providing the public keys. The requests may identify information that enables locating a proper key, such as an identifier of a signature corresponding to the public key, an identifier of the virtual machine instance for which the document was signed, and the like.

Once the instance identity document has been received 1902 and the public key has been obtained, in an embodiment, the document is processed 1906. Processing the document may include using an appropriate signature-verifying algorithm that is able to verify from the document, signature, and public key that the document is authentic (e.g., that the document has not been modified since being signed. The following Java code, which depends on the Apache Commons Codec 1.3 or above for Base64 encoding, may be used with the Sun Java Development Kit (JDK) version 1.6 and above to validate a signature.

```
public boolean validateSignature(String message, String
    signature, java.security.PublicKey key) throws Exception {
    byte[ ] sigBytes=Base64.decodeBase64(signature.getBytes( ));
    Signature   dsaSig=Signature.   getInstance
        ("SHA256withRSA");
    dsaSig.initVerify(key);
    dsaSig.update(message.getBytes( ));
    return dsaSig.verify(sigBytes);
}
```

In this example, the message is the instance identity document, which may be received from a metadata service, the signature is a Base64 encoded signature, and key is a public key which may be loaded from a certificate provided by a computing services provider that provides hardware for operation of a corresponding virtual machine instance.

Accordingly, in an embodiment, once the document is processed, a determination is made 1908 whether the received instance identity document is in fact valid. A determination whether the received instance identity document is valid may be based at least in part on the document being authentic (unaltered) and/or other information, examples of which are provided below. If it is determined 1908 that the instance identity document is valid, then a determination is made 1910 whether the received instance identity document contains necessary properties for performing the requested action. A determination may be made, for example, whether information in the instance identity document indicates that the corresponding virtual machine instance contains a properly licensed version of an application, whether the instance identity document is expired, whether the document was received from an IP address identified in the instance identity document, and/or whether other information in the instance identity document identifies other properties of the instance identity document and/or the corresponding virtual machine instance.

If it is determined 1910 that the received instance identity document contains the necessary properties, then, in an embodiment, the requested action is performed 1912. If, however, it is determined 1906 that the instance identity document is not valid or it has been determined 1908 that the instance identity document does not contain necessary properties, then alternative action may be taken 1914. For instance, the requested action may simply not be performed. One or more notifications about the instance identity document not being valid and/or not containing the necessary properties may be sent to an interested entity such as the owner of the virtual machine instance, in order to provide an alert of the reason why the requested action was not performed, and possibly to provide notification of a security breach which may be the reason why the instance identity document was determined not to be valid. Generally, any alternate action may be taken.

Figure 20:
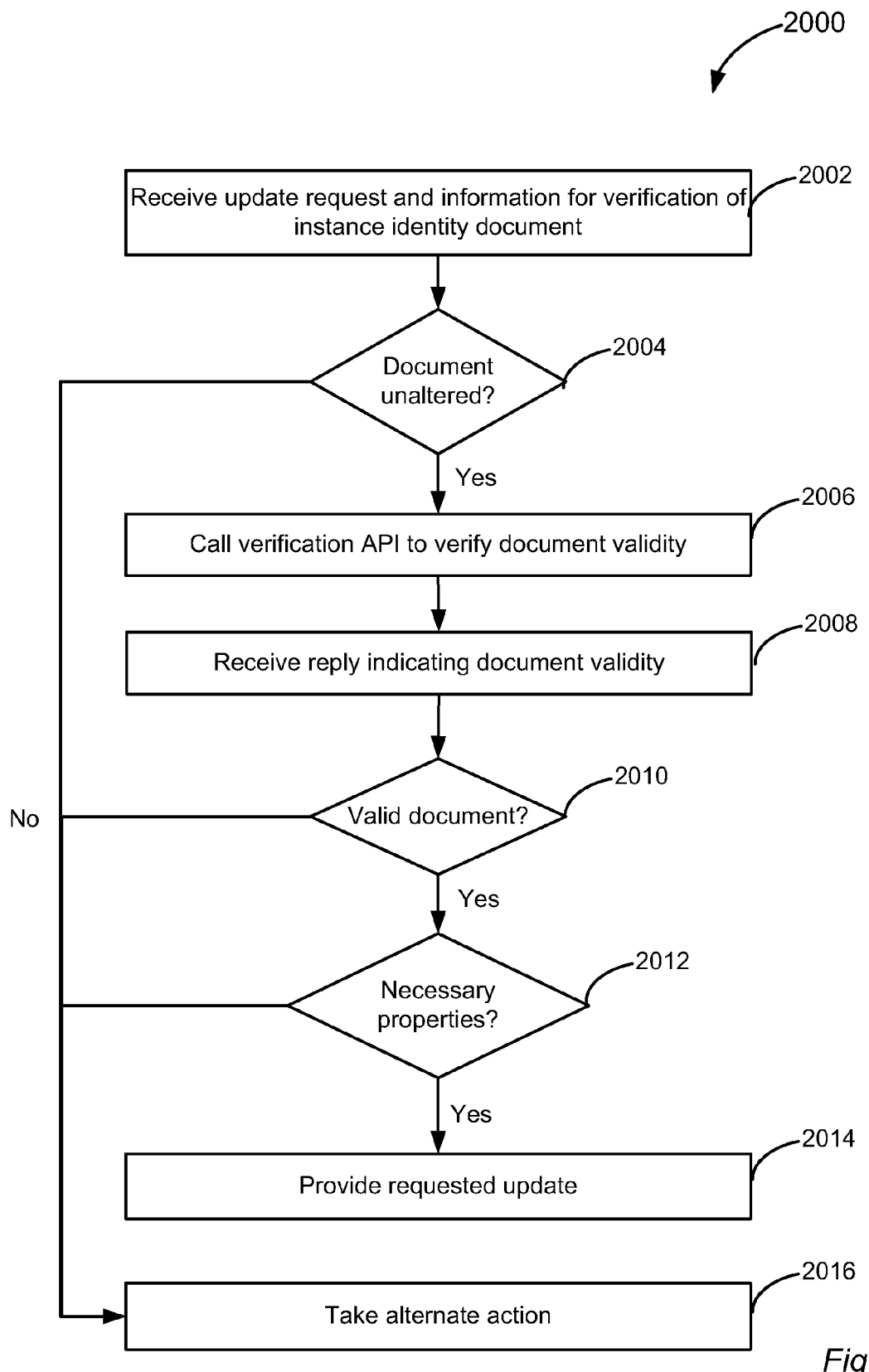
FIG. 20 is a flowchart depicting example steps for using an instance identity document to provide an update service, in accordance with at least one embodiment.
Figure 21:
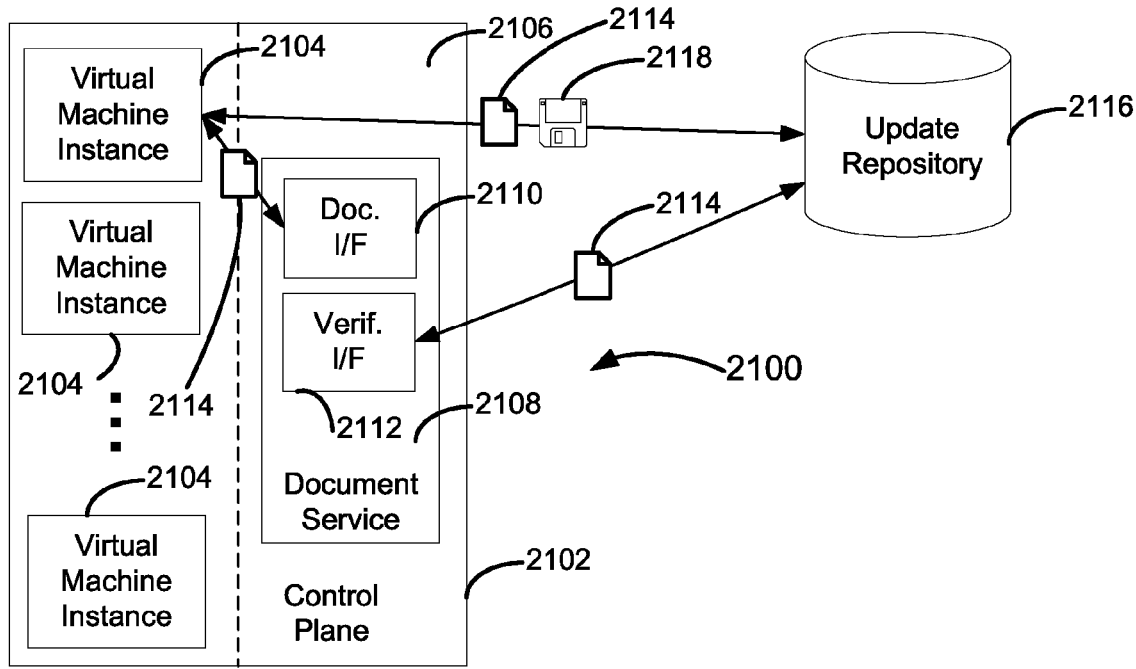
FIG. 21 is a diagram of an environment in which various embodiments of the present disclosure, including the process depicted in FIG. 20, may be implemented, in accordance with at least one embodiment.

As with any process described herein, variations are considered as being within the scope of the present disclosure. For instance, actions other than those illustrated in the flowchart of FIG. 19 may be taken in connection with the process illustrated in FIG. 19. For instance, FIG. 20 illustrates a variation of the process 1900 discussed above in connection with FIG. 19, while FIG. 21 illustrates an example environment where the variation to the process 1900 may be performed and an illustrative example of the flow of information, in accordance with an embodiment. Beginning with FIG. 20, an illustrative example of a process 2000 for utilizing an instance identity document is illustrated. In this example, a request to update an application and information for verification of an instance identity document is received 2002. The information may include a signature for the instance identity document, a public key for processing the signature, and/or the instance identity document itself. In an embodiment, the information for verifying the instance identity document is used to make a determination 2004 whether the instance identity document is unaltered since the signature for the instance identity was generated. If it is determined that the instance identity document is unaltered, in an embodiment, an API call to a document verification (validation) service is made 2006 and a reply is received 2008. The document verification service may be a service implemented using one or more computer systems, that are operable to provide information about the validity of a document. The document verification service may be implemented, for example, as a web service. The document verification service may, for example, be able to receive information identifying an instance identity document or information that is otherwise associated with the instance identity document and use that information to reference a data store to determine information about the instance identity document. The document verification service may, for instance, use received information to reference a data store to determine whether the document is expired and/or whether the document corresponds to a currently active virtual machine instance. Generally, the document verification service may be able to provide any information of, about, and/or associated with an instance identity document.

In an embodiment, when the API of the document verification service is called 2006, a reply indicating the validity of the instance identity document may be received 2008 from the document verification service. Using examples discussed above, the reply may include information that indicates whether the instance identity is expired, whether the instance identity document corresponds to a currently active virtual machine instance, and/or other information related to the instance identity document. Accordingly, once the reply to the API call is received 2008, in an embodiment, a determination is made 2010, based at least in part on the reply, whether the instance identity document is valid. If it is determined that the instance identity document is valid, in an embodiment, a determination is made 2012 whether the instance identity document indicates one or more properties necessary for performance of the requested update. For instance, a determination may be made whether the instance identity document indicates that the corresponding virtual machine instance has installed a properly licensed copy of one or more applications to be updated. Generally, however, a determination may be made whether any property or set of properties is attested to in the instance identity document.

In an embodiment, if it is determined that the instance identity document indicates 2012 the necessary properties, then the requested update is provided 2014. One or more electronic files may, such as a package of update installation files, for example, be provided to the virtual machine instance for which the update was requested. The one or more files may include one or more executable files, drivers, plugins, configuration files, links to information sources, and/or other information used to update one or more applications. Generally, any set of information that may be used to update the virtual machine instance may be provided.

In an embodiment, when one or more reasons preclude providing the requested update, then one or more alternate actions may be taken. For example, if a determination is made 2004 that the instance identity document has been altered, if a determination is made 2010 that the instance identity document is invalid, and/or if a determination is made that the instance identity document does not indicate one or more properties necessary for providing the requested update, then one or more alternate actions may be taken. Alternate actions may include, for instance, refusing to provide the requested update, sending an error message which may indicate one or more reasons why the requested update was not provided, and/or any other alternative actions, including inaction.

As noted above, FIG. 21 shows an environment 2100 in which the process illustrated in FIG. 20, of variations thereof, may be performed. As illustrated, the environment 2100 includes a remote computing services provider 2102, such as the virtual resource provider 212 described above in connection with FIG. 2, that operates hardware used to provision the virtual machine instance. In an embodiment, the remote computing services provider 2102 includes hardware used by the remote computing services provider 2102 to operate a plurality of virtual machine instances 2104 on behalf of one or more customers. In addition, the remote computing services provider 2102 includes a control plane 2106 such as a control plane having properties and capabilities discussed above. In this particular example, however, the control plane 2106 includes a document service 2108 with which communication may be made using a document generation interface 2110 and a verification interface 2112 of a verification service, such as described above. Either or both of the document generation interface 2010 and the verification interface 2012 may be implemented as web service or other interfaces. For example, the verification interface 2112 may be implemented as a web services API over SOAP, representational state transfer (REST), or another web service protocol.

As illustrated, in an embodiment, a virtual machine instance 2104 communicates with the document generation interface 2110 in order to have an instance identity document 2114 made available to the virtual machine instance 2104. For instance, an instance identity document may be provided to the virtual machine instance 2104 over the document generation interface 2110. In some embodiments, the document generation interface allows users and/or virtual machine instances to specify information that should be included in an instance identity document. A user may select (or a virtual machine instance may be configured to select) a subset of a set of information that is available for inclusion in instance identity documents.

In an embodiment, the virtual machine instance 2104 having its instance identity document 2114 provides the instance identity document 2114 and any other information, such as a signature, necessary to verify the validity of the instance identity document 2114 to an update repository 2116. The update repository 2116, in an embodiment, is one or more computing devices collectively operable to provide information that may be used to update one or more applications. While illustrated as outside of the remote computing services provider 2102, the update repository 2116 may, in some embodiments, be implemented using computing resources of the remote computing services provider 2102. For example, the update repository 2116 may be implemented using computing resources of a data center of the remote computing service provider 2102. The update repository may be maintained and operated by the remote computing service provider 2012 or another entity, such as a vendor of one or more applications. In an embodiment, the update repository 2116 uses appropriate information in order to verify that the instance identity document 2114 provided by the virtual machine instance 2104 is valid. The update repository 2116 may, for instance, utilize a signature of a provided instance identity document and a public key made available to the update repository 2116 to verify that the instance identity document 2114 has not been altered since the instance identity document has been signed.

As illustrated in FIG. 21, the update repository 2116 may take additional action in connection with verifying the validity of the instance identity document 2114. In an embodiment, upon receiving the instance identity document 2114, the update repository 2116 provides the instance identity document 2114 or information identifying instance identity document 2114, such as a unique identifier of the instance identity document and information contained in the instance identity document, to the document service 2108. For example, the update repository 2116 may make an API call to the verification interface 2112, providing information necessary to further determine the validity of the instance identity document. For instance, the update repository 2116 may make an API call of the verification interface 2112 in order to determine that the instance identity document 2114 is not expired, to determine that the instance identity document corresponds to a currently active virtual machine instance, and/or to make other determinations and/or receive other information. Upon verifying that the instance identity document is valid, the update repository 2116 may then provide an update requested by the virtual machine instance 2104 to the virtual machine instance. For example, the update repository may provide one or more files to be used by the virtual machine instance 2104 to update one or more applications.

Figure 22:
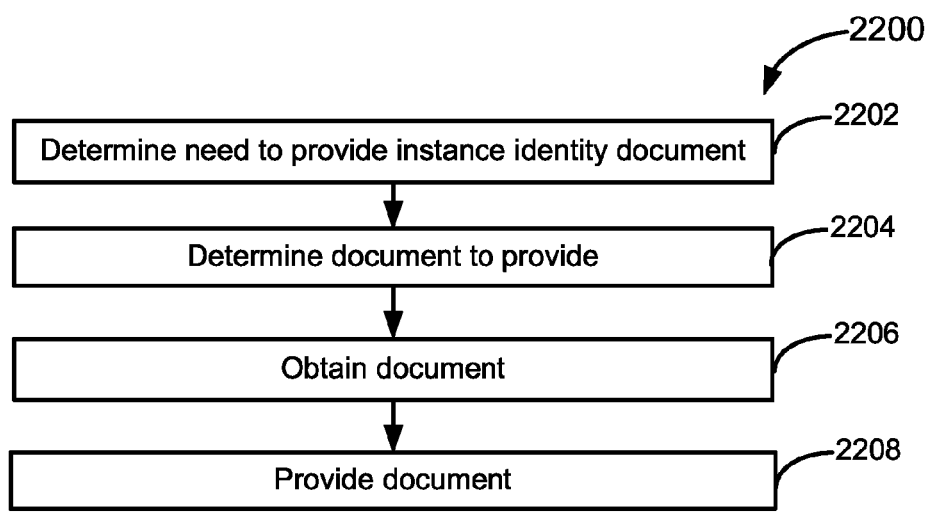
FIG. 22 is a flowchart depicting example steps for providing an instance identity document, in accordance with at least one embodiment.

Several variations of use of instance identity documents are contemplated as being within the scope of the present disclosure. For example, FIG. 22 provides an illustrative example of a process 2200 by which instance identity documents may be used. In this example, multiple different instance identity documents corresponding to a virtual machine instance may be available and one or more of the available instance identity documents may be selected. However, as noted below, the process 2200 is not limited to situations where multiple instance identity documents corresponding to a virtual machine instance are available. Accordingly, in an embodiment, the process 2200 includes determining 2202 a need to provide an instance identity document. The need to provide an instance identity document may be determined in connection with requesting information from a service that requires attestations to one or more properties about a corresponding virtual machine instance. As another example, an instance identity document may have been requested from an update or other service in response to a request that was made to the update or other service. Generally, determining the need to provide the instance identity document may be any suitable manner.

In embodiments, once it has been determined that an instance identity document needs to be provided, a document to provide is determined 2004. For example, an embodiment in which each virtual machine instance has a single instance identity document, that single document may be identified. In an embodiment, however, if a virtual machine instance has multiple instance identity documents, determining the documents to provide may include selecting from the multiple documents a suitable document for providing, based at least in part on one or more criteria. Examples of selecting from multiple available instance identity documents are discussed further below. Once the document to provide has been determined 2204, in an embodiment, the determined instance identity document is obtained 2006, and provided 2208. The virtual machine instance corresponding to the determined instance identity document may be retrieved from memory accessible by a host of the virtual machine instance and sent over a communications network to an appropriate network location, which may, for instance, correspond to an IP address of a service that requires the instance identity document. For instance, the obtained instance identity document may be provided to an update repository, as discussed above. As another example, the virtual machine instance may send a request to a service that is operable to provide instance identity documents on behalf of virtual machine instance, thereby causing the service to provide the instance identity document as appropriate. Generally, any suitable manner of obtaining and/or providing an instance identity document may be used.

Figure 23:
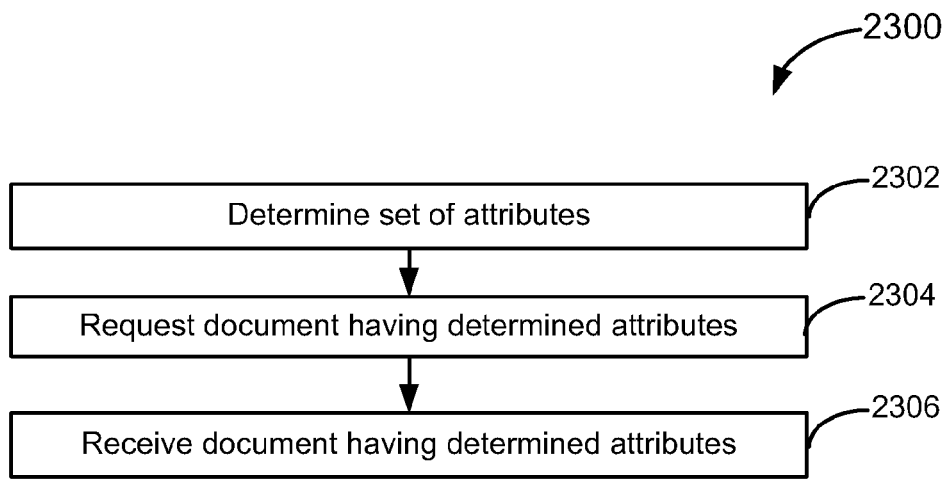
FIG. 23 is a flowchart depicting example steps for obtaining an instance identity document to provide, in accordance with at least one embodiment.

FIG. 23 provides an illustrative example of a process 2300 which may be used to obtain an instance identity in accordance with an embodiment. Thus, the process 2300 may be used to obtain 2206 an instance identity document, as discussed above in connection with FIG. 22 or another process that includes obtaining an instance identity document. As illustrated in FIG. 23, in an embodiment, the process 2300 includes determining 2302 a set of one or more attributes. Determining the set of attributes may be performed in various manners. For instance, in an embodiment, a service operable to perform an action (such as provide information) may identify in an electronic message one or more attributes to which attestation is required. The message may be sent by the service subsequent to a request for the service to perform an action and determining the set of one or more attributes may be accomplished by processing the sent message. In another example, attributes may be stored in a data store in a manner that associates the set of one or more attributes with one or more actions to be performed. Determining the set of one or more attributes may be accomplished by referencing the data store. As a concrete example, a virtual machine instance may access a data store to determine that, to receive an update for an application, the virtual machine instance must have a particular set of attributes attested to. Different services and/or different actions that may be performed by services may require attestation to different sets of attributes and the data store may associate the attributes with corresponding services and/or actions that may be performed by the services. As yet another example, a user (owner) of a virtual machine instance may select or otherwise specify a set of one or more attributes. Generally, however, determining the set of one or more attributes may be performed in any suitable manner.

Upon determination of the set of one or more attributes, in an embodiment, a document having the determined attributes may then be requested 2304. For instance, in the example provided above in FIG. 21, a virtual machine instance may make a call to a document interface of a document service. The call or other communication to the document interface may identify or otherwise indicate the determined attributes. Communication between the virtual machine instance and the document service may be over a secure channel, such as an secure socket layer (SSL) connection. The document service may retrieve from memory and/or generate an appropriate instance identity document that has the determined attributes. As an alternative, information necessary for generating or digitally signing an instance identity document may be provided to a host machine of the virtual machine instance to allow the host machine, upon request of the virtual machine instance, to generate and sign an appropriate instance identity document that has the determined set of one or more attributes. In this example, the host machine may have or have access to an appropriate key used to sign the instance identity document or may provide a generated instance identity document to a service that is operable to sign instance identity documents. Other variations of requesting a document having the determined attributes are considered as being within the scope of the present disclosure. In an embodiment, at a time after the instance identity document has been requested, the instance identity document having the determined attributes is received 2306 from an appropriate device, such as from a device to which the request was made.

Figure 24:
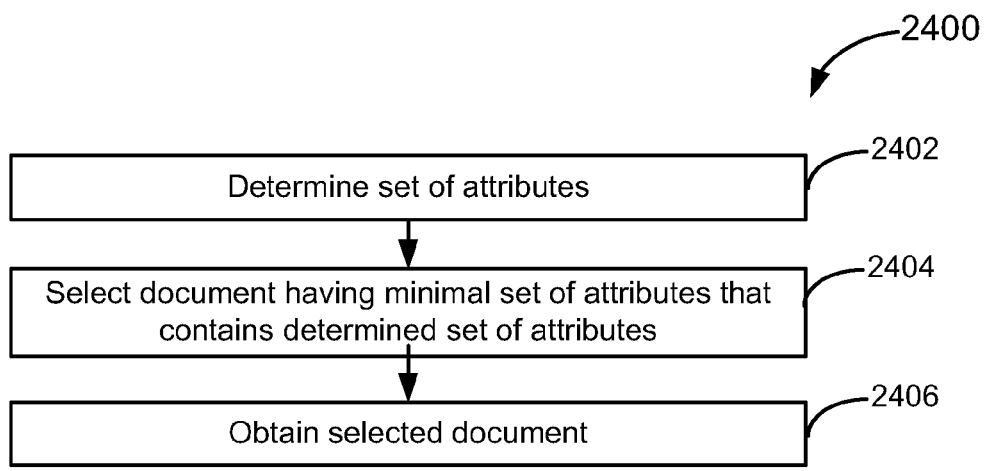
FIG. 24 is a flowchart depicting example steps for obtaining an instance identity document to provide, in accordance with at least one other embodiment.

FIG. 24 also provides another illustrative example of a process 2400 which may be used to obtain an instance identity document. In this particular example, a set of attributes is determined 2402, such as in a manner discussed above. In this particular example, a virtual machine instance has multiple instance identity documents from which to choose. Each of the multiple instance identity documents may include different amounts of information. For instance, one instance identity document for the virtual machine instance may include basic information about the virtual machine instance. Another instance identity document may provide the basic information as well as additional, more detailed information about the virtual machine instance. In general, various amounts of information may be included in different instance identity documents. In addition, if a virtual machine instance has at least two instance identity documents, the information contained in one is not necessarily completely contained in the other, although it may be.

In an embodiment, a document having a minimal set of attributes that contains the determined set of attributes is selected 2404. In this manner, a document containing the least amount of information necessary is selected, and, in an embodiment, the selected instance identity document is obtained 2406, such as in a manner described above. Variations of selecting an appropriate instance identity document are also considered as being within the scope of the present disclosure. For example, in an embodiment, each of a plurality of documents corresponding to a virtual machine instance may be assigned various security levels. The levels may correspond to various levels of sensitivity of the information contained in the documents. In this example, in an embodiment, a document having the lowest security level (least sensitive) but that still contains the determined set of attributes is selected. Generally, any manner of selecting an instance identity document from a plurality of instance identity documents corresponding to a virtual machine instance may be used.

Figure 25:
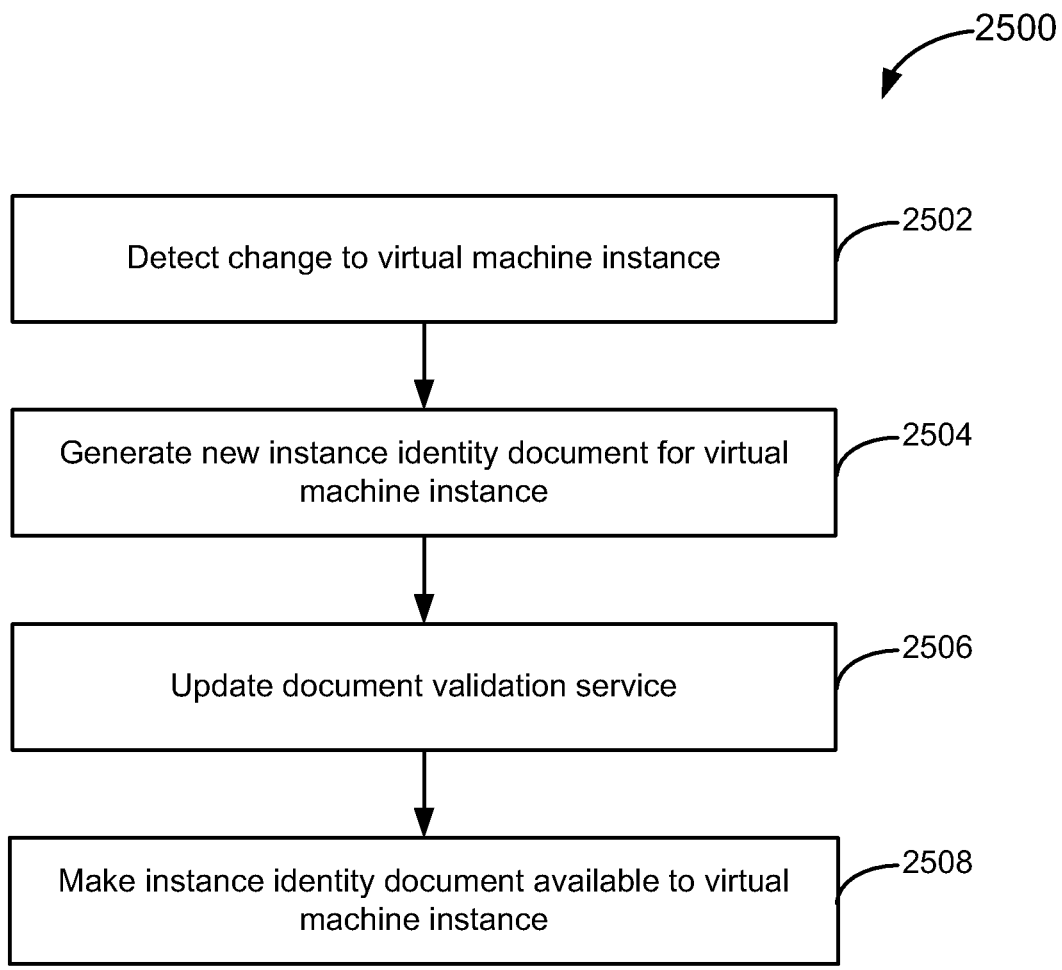
FIG. 25 is a flowchart depicting example steps for updating an instance identity document, in accordance with at least one embodiment.

As noted, instance identity documents may be updated over time. As noted, instance identity documents may be used to attest to one or more properties of a virtual machine instance. If those properties change over time, one or more instance identity documents may be updated accordingly. FIG. 25, therefore, provides an illustrative example of a process 2500 for updating an instance identity document for a virtual machine instance. In an embodiment, the process 2500 includes detecting 2502 a change to a virtual machine instance. The changes may be as a result of a control plane monitoring one or more events in connection with the virtual machine instance. For example, a change of an update of one or more applications utilized by the virtual machine instance may be detected. Generally, any property of a virtual machine instance that has changed may be detected including, but not limited to, the properties described above.

In an embodiment, once the change to the virtual machine instance has been detected, a new instance identity document corresponding to the virtual machine instance is generated 2504. The new instance identity document, in an embodiment, includes information corresponding to one or more properties about the virtual machine instance that have changed. Generation of the new instance identity document may be performed in any suitable manner such as in a manner described above. In addition, in instances where an API or other interface is available for validation of instance identity documents by entities that have received the instance identity document, a document validation service such as the verification interface 2112, discussed above in connection with FIG. 21, may be updated 2506 accordingly. In this manner, should an entity attempt to verify the validity of the new instance identity document, the validation service will be current, and will provide a correct response regarding the validity of the document. In an embodiment, once the document validation service has been updated 2506, the instance identity document is made available to the virtual machine instance corresponding to the new instance identity document, such as in a manner discussed above.

As noted, variations of the descriptions above are considered as being within the scope of the present disclosure. For example, the above-illustrative examples describe various aspects in terms of providing a single instance identity document to attest to one or more properties of a virtual machine instance or other computing resource. However, multiple instance identity documents may be provided to attest to various properties of computing resources. The information contained in the multiple instance identity documents differ among the instance identity documents. As just one example, each of a plurality of documents may be used to attest to one or more corresponding properties of a virtual machine instance. In addition, one or more instance identity documents may be used to attest to one or more properties of multiple computing resources, such as multiple virtual machine instances. Such variations and other variations may be implemented using variations of the examples described above.

Other variations are also contemplated as being within the spirit of the present disclosure. For instance, for the purpose of illustration, various embodiments are discussed in connection with virtual machine instances. However, various other embodiments may involve other virtual computing resources. For instance, any virtual computing resource that uses credentials to access another virtual computing resource may utilize various embodiments described herein, and variations thereof. Generally, techniques described and suggested herein are not limited to virtual computing instances. In addition, various techniques described and suggested herein may be used in connection with virtual computing resources in addition to virtual machine instances.

Generally, the various embodiments described herein may be implemented in a wide variety of operating environments, which in some cases may include one or more user computers, computing devices, or processing devices which may be utilized to operate any of a number of applications. User or client devices may include any of a number of general purpose personal computers, such as desktop or laptop computers running a standard operating system, as well as cellular, wireless, and handheld devices running mobile software and capable of supporting a number of networking and messaging protocols. Such a system also may include a number of workstations running any of a variety of commercially-available operating systems and other known applications for purposes such as development and database management. These devices also may include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. Such a network may include, for example, a local area network, a wide-area network, a virtual private network, the Internet, an intranet, an extranet, a public switched telephone network, an infrared network, a wireless network, and any combination thereof. The network may, furthermore, incorporate any suitable network topology. Examples of suitable network topologies include, but are not limited to, simple point-to-point, star topology, self organizing peer-to-peer topologies, and combinations thereof.

In embodiments utilizing a Web server, the Web server may run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment may include a variety of data stores and other memory and storage media as discussed above. These may reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device may include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also may include a computer-readable storage media reader, a communications device (e.g., a modem, a network card (wireless or wired), an infrared communication device, etc.), and working memory as described above. The computer-readable storage media reader may be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules including program modules, services, or other elements located within at least one working memory device, including an operating system and application programs, such as a client application or Web browser. It should be appreciated that alternate embodiments may have numerous variations from that described above. For example, customized hardware might also be utilized and/or particular elements might be implemented in hardware, software (including portable software, such as applets), or both. Further, connection to other computing devices such as network input/output devices may be employed.

Storage media and computer readable media for containing code, or portions of code, may include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which may be utilized to store the desired information and which may be accessed by the a system device. Program modules, program components and/or programmatic objects may include computer-readable and/or computer-executable instructions of and/or corresponding to any suitable computer programming language. In at least one embodiment, each computer-readable medium may be tangible. In at least one embodiment, each computer-readable medium may be non-transitory in time. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

The use of the terms "a" and "an" and "the" and similar referents in the context of describing embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope unless otherwise claimed. No language in the specification should be construed as indicating any non-claimed element as essential to the practice of at least one embodiment.

Preferred embodiments are described herein, including the best mode known to the inventors. Variations of those preferred embodiments may become apparent to those of ordinary skill in the art upon reading the foregoing description. The inventors expect skilled artisans to employ such variations as appropriate, and the inventors intend for embodiments to be constructed otherwise than as specifically described herein. Accordingly, suitable embodiments include all modifications and equivalents of the subject matter recited in the claims appended hereto as permitted by applicable law. Moreover, any combination of the above-described elements in all possible variations thereof is contemplated as being incorporated into some suitable embodiment unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method for attesting to one or more properties of a virtual machine instance, comprising:
   under the control of one or more computer systems configured with executable instructions,
   detecting a provisioning event of a virtual machine instance, the provisioning event generated as part of a workflow including:
      allocating hardware resources to the virtual machine instance; and
      sending one or more messages with respect to virtual machine instance component provisioning;
   in response to detecting the provisioning event, determining one or more attributes for the virtual machine instance, including a type of provisioning event detected;
   generating a document incorporating the determined one or more attributes, including the type of provisioning event detected;
   cryptographically signing the generated document, including at least:
      generating, using a public key cryptography signature scheme, a signature for the document;
      making the cryptographically signed document available to the virtual machine instance includes making the generated signature available to the virtual machine instance; and
      enabling the virtual machine instance to provide the cryptographically signed document including enabling the virtual machine instance to provide the generated signature with the cryptographically signed document;
   providing access to the cryptographically signed document to the virtual machine instance; and
   enabling the virtual machine instance to provide the cryptographically signed document to one or more services that are operable to take one or more actions based at least in part on the determined one or more attributes in the provided cryptographically signed document.

2. The computer-implemented method of claim 1, wherein the one or more actions include providing an update for one or more applications of the virtual machine instance.

3. The computer-implemented method of claim 1, wherein the one or more computer systems are part of a control environment of a computing services provider that provides hardware for operation of the virtual machine instance.

4. The computer-implemented method of claim 1, further comprising:
   receiving, from the one or more services, a request for information related to the cryptographically signed document; and
   in response to the request to verify the information related to the cryptographically signed document, providing the requested information.

5. The computer-implemented method of claim 1, wherein the one or more attributes indicate at least a right of a user of the virtual machine instance to use a particular application and wherein at least one of the one or more actions is conditioned on at least the right.

6. The computer-implemented method of claim 1, wherein the one or more actions include providing an update for an operating system of the virtual machine instance.

7. A computer-implemented method of attesting to one or more properties of at least one computing resource, comprising:
   under the control of one or more computer systems configured with executable instructions;
   detecting one or more events related to the computing resource;
   in response to detection of the one or more events, generating one or more documents incorporating one or more attributes of the computing resource, including one or more types of the one or more events detected;
   electronically signing the one or more generated documents, including at least:
      generating, using a public key cryptography signature scheme, a signature for the one or more generated documents;

making the electronically signed one or more documents available to the computing resource includes making the generated signature available to the computing resource; and enabling the computing resource to provide the electronically signed one or more documents including enabling the computing resource to provide the generated signature with the electronically signed one or more documents; and providing access to the electronically signed one or more documents for attestation to a set of the one or more attributes of the computing resource to enable one or more other computing resources to take one or more actions based at least in part on attestation to the set of the one or more attributes, including the one or more types of the one or more events detected.

8. The computer-implemented method of claim 7, wherein the one or more actions include providing an update for one or more components of the computing resource.

9. The computer-implemented method of claim 8, wherein the one or more attributes indicate licensing information of the one or more components of the computing resource.

10. The computer-implemented method of claim 7, wherein the computing resource is a virtual machine instance.

11. The computer-implemented method of claim 7, wherein the one or more actions include causing a load balancer to direct network traffic to the computing resource.

12. The computer-implemented method of claim 7, further comprising:
receiving a request for information related to the electronically signed document; and
responsive to the request, providing the requested information.

13. The computer-implemented method of claim 7, wherein the one or more documents include a plurality of documents that each incorporates a different set of one or more attributes, and wherein attestation to the set of the one or more attributes includes selecting a subset of the plurality of documents to be provided to the one or more other computing resources.

14. The computer-implemented method of claim 7, wherein the one or more events include a request for attestation to the one or more attributes.

15. The computer-implemented method of claim 14, wherein the request for attestation is made by a user of the computing resources.

16. The computer-implemented method of claim 7, wherein the at least one computing resource includes a plurality of computing resources and wherein the generated one or more documents collectively incorporates one or more attributes of the plurality of computing resources.

17. The computer-implemented method of claim 7, wherein the one or more events include one or more events resulting in a change of one or more properties of the computing resource.

18. The computer-implemented method of claim 7, wherein the one or more documents each incorporates at least a subset of the one or more attributes of the computing resource in a manner that is both human readable and machine readable.

19. A computer-implemented method of verifying one or more properties of at least one computing resource, comprising:
under the control of one or more computer systems configured with executable instructions;
receiving one or more electronically signed documents that collectively attest to one or more attributes of a computing resource, the one or more electronically signed documents incorporating one or more attributes of the computing resource, including a type of a provisioning event of the computing resource, the provisioning event generated as part of a workflow including:
allocating hardware resources to a virtual machine instance; and
sending one or more messages with respect to virtual machine instance component provisioning;
verifying the presence of a set of particular attributes incorporated in the one or more received electronically signed documents, including the type of the provisioning event;
verifying, based at least in part on one or more electronic signatures of the electronically signed documents, authenticity of the one or more electronically signed documents and wherein verifying the presence of the set of particular attributes is conditioned on the authenticity; and
when the presence of the set of particular attributes incorporated in the one or more received electronically signed documents is verified, taking one or more actions in connection with the computing resource in accordance with the type of provisioning event.

20. The computer-implemented method of claim 19, wherein the one or more actions include providing an update for a component of the computing resource.

21. The computer-implemented method of claim 19, wherein the computing resource is a virtual machine instance.

22. The computer-implemented method of claim 19, wherein verifying the presence of the set of particular attributes includes:
requesting information relating to the one or more received electronically signed documents; and receiving the requested information.

23. The computer-implemented method of claim 19, wherein the computing resource is operated by a computing services provider under the direction of a customer of the computing services provider and wherein at least some of the attributes to which the one or more electronically signed documents collectively attest are provided from the computing services provider for use in the one or more electronically signed documents.

24. The computer-implemented method of claim 23, wherein the one or more electronically signed documents were generated by the computing services provider.

25. The computer-implemented method of claim 19, wherein the one or more attributes include one or more conditions for validity of the one or more electronically signed documents.

26. The computer-implemented method of claim 25, wherein the one or more conditions include at least one of the group consisting of an initial document validity time, a final document validity time, and a location.

27. A system for attesting to information, comprising:
one or more processors; and
memory including executable instructions that, when executed by the one or more processors, cause the system to at least:
detect one or more events related to at least one computing resource;
in response to detection of the one or more events, generate one or more documents incorporating one or more attributes of the at least one computing resource, including one or more types of the one or more events detected;
electronically sign the one or more generated documents, including at least:

generating, using a public key cryptography signature scheme, a signature for the one or more generated documents;

making the one or more electronically signed documents available to the computing resource includes making the generated signature available to the at least one computing resource; and enabling the at least one computing resource to provide the one or more electronically signed documents including enabling the at least one computing resource to provide the generated signature with the one or more electronically signed documents; and provide access to the electronically signed one or more documents for attestation to a set of the one or more attributes of the at least one computing resource to enable one or more other computing resources to take one or more actions based at least in part on attestation to the set of the one or more attributes, including the one or more types of the one or more events detected.

28. The system of claim 27, wherein the one or more actions include providing an update for one or more components of the computing resource.

29. The system of claim 27, wherein the computing resource is a virtual machine instance.

30. The system of claim 27, wherein the memory further includes instructions that, when executed by the one or more processors, cause the system to at least:

receive a request for information related to the electronically signed document; and responsive to the request, provide the requested information.

31. One or more non-transitory computer-readable storage media having collectively stored thereon instructions that, when executed by one or more processors of a computer system, cause the computer system to at least:

receive one or more electronically signed documents that collectively attest to one or more attributes of at least one computing resource, the one or more electronically signed documents incorporating one or more attributes of the computing resource, including a type of a provisioning event detected, the provisioning event generated as part of a workflow including:

allocating hardware resources to the at least one computing resource; and sending one or more messages with respect to computing resource component provisioning;

verify the presence of a set of particular attributes incorporated in the one or more received electronically signed documents, including the type of the provisioning event detected;

verifying, based at least in part on one or more electronic signatures of the electronically signed documents, authenticity of the one or more received electronically signed documents and wherein verifying the presence of the set of particular attributes is conditioned on the authenticity; and when the presence of the set of particular attributes incorporated in the one or more received electronically signed documents is verified, take one or more actions in connection with the computing resource.

32. The one or more non-transitory computer-readable storage media of claim 31, wherein the one or more actions include providing an update for one or more components of the computing resource.

33. The one or more non-transitory computer-readable storage media of claim 31, wherein verifying the presence of the set of particular attributes includes:

requesting information relating to the one or more received electronically signed documents; and receiving the requested information.

34. The computer-implemented method of claim 1, wherein detecting a provisioning event of a virtual machine instance includes detecting whether a security breach as occurred.

35. The computer-implemented method of claim 34, further comprising, in response to detecting that a security breach has occurred, determining a type of the security breach, wherein the generated document incorporates the type of the security breach, wherein the enabling of the virtual machine instance is based at least in part on the type of the security breach incorporated in the generated document.

* * * * *

UNITED STATES PATENT AND TRADEMARK OFFICE
CERTIFICATE OF CORRECTION

| | | |
|---|---|---|
| PATENT NO. | : 8,607,067 B1 | Page 1 of 1 |
| APPLICATION NO. | : 13/038277 | |
| DATED | : December 10, 2013 | |
| INVENTOR(S) | : Cornelle Christiaan Pretorius Janse Van Rensburg et al. | |

It is certified that error appears in the above-identified patent and that said Letters Patent is hereby corrected as shown below:

In the Claims

Claim 34, column 46, line 32, please delete "as"

and insert -- has --

Signed and Sealed this
Third Day of June, 2014

Michelle K. Lee
*Deputy Director of the United States Patent and Trademark Office*